United States Patent
Qiu et al.

(10) Patent No.: US 11,947,497 B2
(45) Date of Patent: Apr. 2, 2024

(54) PARTIAL IN-LINE DEDUPLICATION AND PARTIAL POST-PROCESSING DEDUPLICATION OF DATA CHUNKS

(71) Applicant: Cohesity, Inc., San Jose, CA (US)

(72) Inventors: Zhihuan Qiu, San Jose, CA (US); Yu Liu, Milpitas, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/410,745

(22) Filed: Aug. 24, 2021

(65) Prior Publication Data

US 2023/0062644 A1   Mar. 2, 2023

(51) Int. Cl.
*G06F 7/00* (2006.01)
*G06F 16/174* (2019.01)

(52) U.S. Cl.
CPC ............... *G06F 16/1752* (2019.01)

(58) Field of Classification Search
CPC .................. G06F 16/1752; G06F 16/1748
See application file for complete search history.

(56) References Cited

U.S. PATENT DOCUMENTS

| | | | |
|---|---|---|---|
| 8,108,353 B2 | 1/2012 | Balachandran | |
| 9,329,942 B2 | 5/2016 | Chavda | |
| 10,706,014 B1 * | 7/2020 | Gupta | G06F 3/0604 |
| 10,754,731 B1 * | 8/2020 | Arumugam | G06F 11/1461 |
| 11,474,673 B1 * | 10/2022 | Abdul-Jawad | G06F 9/54 |
| 2009/0271454 A1 * | 10/2009 | Anglin | G06F 11/1453 |
| 2009/0300321 A1 | 12/2009 | Balachandran | |
| 2009/0313248 A1 | 12/2009 | Balachandran | |
| 2010/0161608 A1 | 6/2010 | Jain | |
| 2010/0250501 A1 * | 9/2010 | Mandagere | G06F 16/285 |
| | | | 711/216 |
| 2010/0333116 A1 * | 12/2010 | Prahlad | G06F 16/1844 |
| | | | 713/153 |
| 2011/0225130 A1 * | 9/2011 | Tokoro | G06F 16/221 |
| | | | 707/E17.005 |
| 2013/0018855 A1 * | 1/2013 | Eshghi | G06F 11/1453 |
| | | | 707/E17.002 |

(Continued)

FOREIGN PATENT DOCUMENTS

WO    2018075042    4/2018

OTHER PUBLICATIONS

Fu et al., Design Tradeoffs for Data Deduplication Performance in Backup Workloads, 13th USENIX Conference on File and Storage Technologies (FAST '15), Feb. 2015, pp. 331-344.

(Continued)

*Primary Examiner* — Mohammed R Uddin
(74) *Attorney, Agent, or Firm* — Shumaker & Sieffert, P.A.

(57) ABSTRACT

Data is ingested from a source system. Ingesting the data includes determining corresponding chunk identifiers for a plurality of data chunks corresponding to the ingested data and for each of the plurality of data chunks, verifying whether the corresponding chunk identifier is included in a data structure tracking identifiers of data chunks that were already stored in a storage of a storage system before the data ingestion started and storing the data chunk in a storage based on the verification. After the ingesting is completed, deduplication of the ingested data chunks stored in the storage having a same chunk identifier is performed and the data structure is updated based on the deduplication.

18 Claims, 16 Drawing Sheets

(56) References Cited

U.S. PATENT DOCUMENTS

| | | | | |
|---|---|---|---|---|
| 2013/0041872 | A1* | 2/2013 | Aizman | G06F 16/182 |
| | | | | 707/690 |
| 2013/0086006 | A1* | 4/2013 | Colgrove | G06F 16/137 |
| | | | | 707/E17.005 |
| 2013/0097380 | A1 | 4/2013 | Colgrove | |
| 2013/0268496 | A1* | 10/2013 | Baldwin | G06F 16/1748 |
| | | | | 707/E17.002 |
| 2013/0282672 | A1* | 10/2013 | Tashiro | G06F 3/0641 |
| | | | | 707/E17.002 |
| 2014/0114932 | A1* | 4/2014 | Mallaiah | G06F 3/0608 |
| | | | | 707/E17.032 |
| 2015/0356109 | A1* | 12/2015 | Arikawa | G06F 11/00 |
| | | | | 707/692 |
| 2016/0026652 | A1 | 1/2016 | Zheng | |
| 2017/0131934 | A1* | 5/2017 | Kaczmarczyk | G06F 3/0673 |
| 2018/0329631 | A1 | 11/2018 | Swift | |
| 2019/0121673 | A1* | 4/2019 | Gold | G06F 3/0679 |
| 2019/0130434 | A1* | 5/2019 | Lurie | G06Q 30/0222 |
| 2020/0081644 | A1 | 3/2020 | Jeyaram | |
| 2020/0125450 | A1* | 4/2020 | Aron | G06F 16/13 |
| 2020/0272492 | A1 | 8/2020 | Guturi | |
| 2021/0109900 | A1* | 4/2021 | McIlroy | G06F 16/1752 |
| 2021/0117441 | A1* | 4/2021 | Patel | G06F 16/215 |
| 2021/0303155 | A1 | 9/2021 | Meister | |
| 2021/0303519 | A1* | 9/2021 | Periyagaram | G06F 16/17 |
| 2021/0365296 | A1 | 11/2021 | Shilane | |

OTHER PUBLICATIONS

Kaplan et al., From Processing-in-Memory to Processing-in-Storage, Supercomputing Frontiers and Innovations, 2017, pp. 99-116, vol. 4, No. 3.

Li et al., Efficient Hybrid Inline and Out-of-Line Deduplication for Backup Storage, Oct. 12, 2018.

Ma et al., Lazy Exact Deduplication, 2017.

Vinod Mohan, Inline vs. Post-Process Deduplication and Compression, DataCore, Mar. 8, 2021, https://www.datacore.com/blog/inline-vs-post-process-deduplication-compression/.

Wang et al., I-sieve: An Inline High Performance Deduplication System Used in Cloud Storage, Tsinghua Science and Technology, Feb. 2015, pp. 17-27, vol. 20, No. 1.

Wu et al., HPDedup: A Hybrid Prioritized Data Deduplication Mechanism for Primary Storage in the Cloud, 2017.

* cited by examiner

400

| ChunkID | Chunk File ID |
|---|---|
| $SHA-1_a$ | 1 |
| $SHA-1_b$ | 1 |
| $SHA-1_c$ | 1 |
| $SHA-1_d$ | 1 |
| $SHA-1_e$ | 2 |
| $SHA-1_f$ | 2 |
| $SHA-1_g$ | 2 |
| $SHA-1_h$ | 2 |

| Chunk File ID | Chunk IDs | Storage Node | Primary Owner | Post-Processing |
|---|---|---|---|---|
| 1 | $SHA-1_a$; $SHA-1_b$; $SHA-1_c$; $SHA-1_d$ | 1, 3 | File 1 | |
| 2 | $SHA-1_e$; $SHA-1_f$; $SHA-1_g$; $SHA-1_h$ | 2, 4 | File 1 | |
| 3 | $SHA-1_i$; $SHA-1_j$; $SHA-1_k$; $SHA-1_l$ | 2, 3 | File 2 | x |
| 4 | $SHA-1_m$; $SHA-1_n$; $SHA-1_o$; $SHA-1_l$ | 1, 4 | File 3 | x |

| ChunkID | Chunk File ID |
|---------|---------------|
| $SHA-1_a$ | 1 |
| $SHA-1_b$ | 1 |
| $SHA-1_c$ | 1 |
| $SHA-1_d$ | 1 |
| $SHA-1_e$ | 2 |
| $SHA-1_f$ | 2 |
| $SHA-1_g$ | 2 |
| $SHA-1_h$ | 2 |
| $SHA-1_i$ | 3 |
| $SHA-1_j$ | 3 |
| $SHA-1_k$ | 3 |
| $SHA-1_l$ | 3 |
| $SHA-1_m$ | 4 |
| $SHA-1_n$ | 4 |
| $SHA-1_o$ | 4 |

| Chunk File ID | Chunk IDs | Storage Node | Primary Owner | Post-Processing |
|---|---|---|---|---|
| 1 | SHA-1$_a$; SHA-1$_b$; SHA-1$_c$; SHA-1$_d$ | 1, 3 | File 1 | |
| 2 | SHA-1$_e$; SHA-1$_f$; SHA-1$_g$; SHA-1$_h$ | 1, 3 | File 2 | |
| 3 | SHA-1$_i$; SHA-1$_j$; SHA-1$_k$; SHA-1$_l$ | 1, 3 | File 3 | |
| 4 | SHA-1$_m$; SHA-1$_n$; SHA-1$_o$ | 1, 3 | File 4 | |

FIG. 4D

PARTIAL IN-LINE DEDUPLICATION AND PARTIAL POST-PROCESSING DEDUPLICATION OF DATA CHUNKS

BACKGROUND OF THE INVENTION

A storage system may perform a series of backups of a source system. A backup may be a full backup or an incremental backup of the source system. The storage system stores data included in a backup as a plurality of data chunks. Some of the data chunks included in a backup may be a duplicate of other data chunks included in the backup. Some of the data chunks included in a backup may be a duplicate of other data chunks already stored by the storage system. The storage system may deduplicate the data chunks to improve storage utilization by removing duplicate instances of a data chunk and storing a single instance of the data chunk.

BRIEF DESCRIPTION OF THE DRAWINGS

Various embodiments of the invention are disclosed in the following detailed description and the accompanying drawings.

FIG. 4A is a diagram illustrating a data structure in accordance with some embodiments.

FIG. 4B is a diagram illustrating a data structure in accordance with some embodiments.

FIG. 4C is a diagram illustrating a data structure in accordance with some embodiments.

FIG. 4D is a diagram illustrating a data structure in accordance with some embodiments.

DETAILED DESCRIPTION

Figure 1:
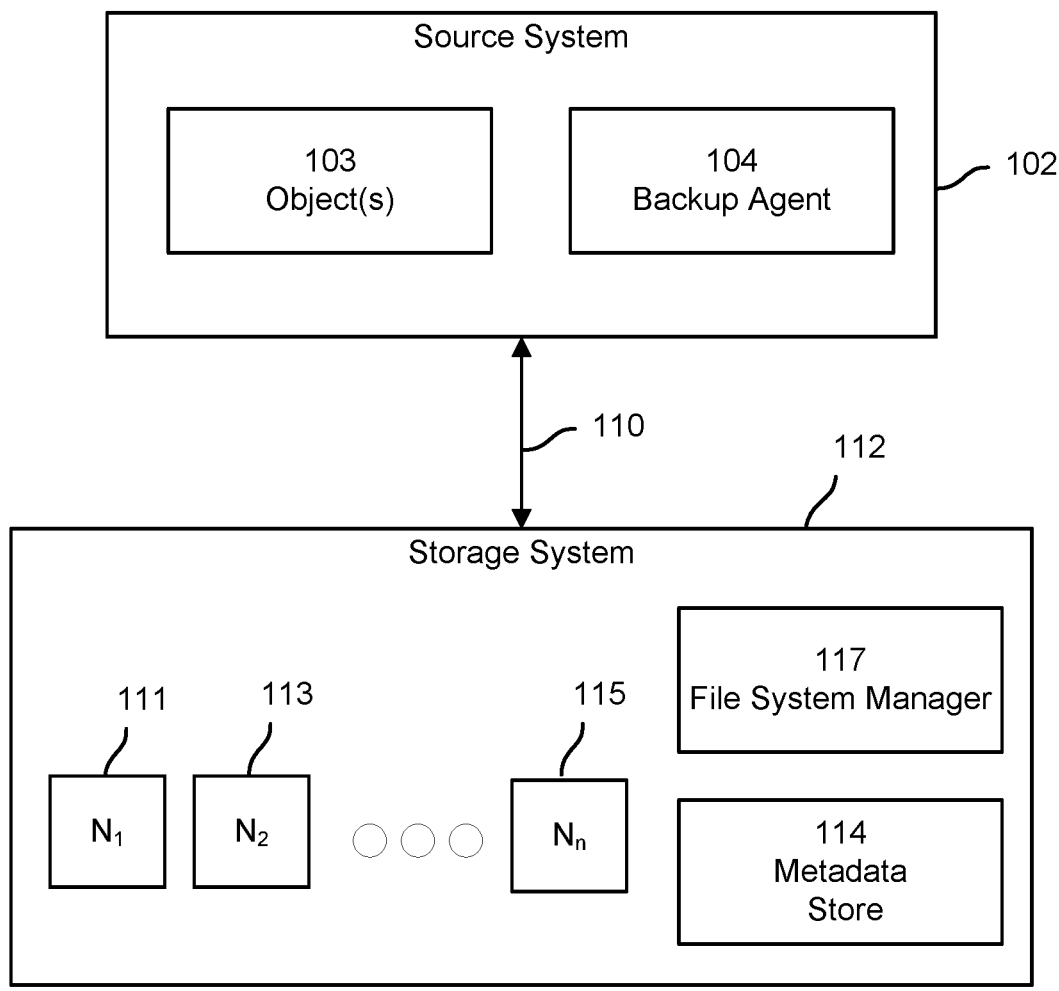
FIG. 1 is a block diagram illustrating an embodiment of a system for performing deduplication.

A storage system performs a backup of a source system by ingesting data from the source system and storing the data as a plurality of data chunks in one or more chunk files that are stored in one or more storage devices associated with the storage system. In some embodiments, duplicate copies of data chunks may be included within a backup. In some embodiments, duplicate copies of data chunks may be included across a plurality of backups. The storage system may perform deduplication to remove the duplicate copies of data chunks.

In-line deduplication is a technique in which data is deduplicated while it is being ingested from a source system to a storage system, e.g., a single copy of a data chunk is stored after a backup is completed. The storage system maintains a chunk metadata data structure (e.g., a table) in a metadata store that indicates the data chunks that are already stored by the storage system. Each entry of the chunk metadata data structure may associate a data chunk with a chunk identifier associated with a data chunk with a chunk file identifier of a chunk file storing the data chunk. When a storage node receives a request for an object, the storage node utilizes the chunk metadata data structure to lookup a storage location for the data chunks associated with an object.

Other storage systems may perform in-line deduplication while data is being ingested such that the chunk metadata data structure only stores a single entry for each data chunk stored by the storage system. However, in-line deduplication may slow the data ingestion process due to the number of metadata operations that need to be performed when writing the plurality of data chunks. A storage system is configured to write a batch of data chunks to a storage device. Each time a batch of data chunks is written to a storage device, the storage system needs to update the chunk metadata data structure, but before the storage device is able to write the batch of data chunks and update the chunk metadata data structure, the storage device needs to verify whether any of the data chunks included in the batch are already stored by the storage system (e.g., stored in a previous backup or stored earlier in a current backup).

For example, the storage system may be configured to perform a backup by writing the data in 1 MB increments to a storage device. The 1 MB of data may be comprised of 32 data chunks. Each time the storage system writes 1 MB of data, the storage system needs to determine whether any of the 32 data chunks have been previously stored by the storage system and only update the chunk metadata data structure for data chunks that the storage system has not previously stored. The storage system deduplicates a data chunk included in the backup with respect to data chunks included in a previous backup that were already stored by the storage system and with respect to other data chunks included in the same backup that were previously stored by the storage system. A backup may be comprised of a large amount of data (e.g., 1 TB). Thus, performing in-line deduplication for a large amount of data may take a long time to perform.

Other storage systems may perform post-processing deduplication after data has been ingested from a source system. One technique to perform post-processing deduplication is to ingest the data, chunk the data into a plurality of fixed-sized data chunks, and write the plurality of data chunks to the one or more storage devices associated with a storage system without considering whether any of the ingested data chunks are already stored by the storage system. When compared to in-line deduplication, this technique of post-processing deduplication results in a faster data ingestion. However, post-processing deduplication is very resource intensive because it requires a large number of I/Os to be performed. Data that was written during data ingestion needs to be read, re-chunked into variable-sized data chunks for deduplication purposes, and then re-written to the one or more storage devices associated with the storage system.

A technique to deduplicate data by performing partial in-line deduplication and partial post-processing deduplication is disclosed herein. Although the technique is described with respect to backup, the technique disclosed herein may be applicable whenever a data management operation (e.g., backup, migration, replication, archive, etc.) is performed for a cohort of data that is provided from a first system to a second system. In some embodiments, the storage system ingests data from the source system and chunks the ingested data into a plurality of data chunks. In some embodiments, the data chunks are variable sized. In some embodiments, the data chunks are a fixed size. The storage system generates a corresponding chunk identifier for each of the data chunks.

During data ingestion, the storage system performs partial in-line deduplication by deduplicating data chunks included in a backup with respect to data chunks already stored by the storage system, not with respect to other data chunks included in the same backup. The storage system verifies whether the corresponding chunk identifier is stored in the chunk metadata data structure. The chunk metadata data structure identifies the plurality of chunks that were already stored by the storage system before the data management service started. In the event the corresponding chunk identifier is stored in the chunk metadata data structure, then the storage system does not store the data chunk. Instead, the storage system stores a reference to a storage location of the already stored data chunk and deletes the data chunk from a memory (e.g., flash memory, random access memory, erasable programmable read only memory, solid-state drive, etc.) of the storage system. In the event the corresponding chunk identifier is not stored in the chunk metadata data structure, then the storage system stores the data chunk in a chunk file that is stored in a storage device associated with the storage system, updates a chunk file metadata data structure to indicate that the chunk file needs to undergo partial post-processing deduplication, and updates a node of a tree data structure to store a reference to the chunk file storing the data chunk. Although the storage system may store some duplicate copies of data chunks after ingesting the data, the number of metadata operations performed by the storage system during the ingestion period is significantly reduced because the chunk metadata data structure is not updated each time a new data chunk is stored by the storage system.

In some embodiments, a source system chunks the data to be stored at the storage system into a plurality of data chunks, determines a corresponding chunk identifier (e.g., SHA-1 hash value) for each of the plurality of data chunks, and sends the chunk identifiers to the storage system. In response, the storage system determines whether the received chunk identifiers are stored in the chunk metadata data structure. In the event a corresponding chunk identifier is stored in the chunk metadata data structure, then the storage system does not request the data chunk from the source system. In the event the corresponding chunk identifier is not stored in the chunk metadata data structure, then the storage system requests the data chunk from the source system, receives and stores the data chunk in a chunk file that is stored in a storage device associated with the storage system, updates a chunk file metadata data structure to indicate that the chunk file needs to undergo partial post-processing deduplication, and updates a node of a tree data structure to store a reference to the chunk file storing the data chunk.

In some embodiments, prior to storing the data chunk in the chunk file, the storage system verifies that the chunk file does not already store another copy of the data chunk.

During data ingestion, the storage system updates a chunk file metadata data structure when a data chunk is written to a chunk file and generates, as described herein, a tree data structure that enables data chunks included in the ingested data to be located. The storage system maintains a chunk file metadata data structure that associates a chunk file identifier with one or more chunk identifiers. This indicates the one or more data chunks that are stored in the chunk file having the chunk file identifier. The chunk file metadata data structure is updated to associate a chunk file identifier with one or more chunk identifiers corresponding to one or more data chunks that were stored during data ingestion.

The tree data structure includes a plurality of nodes that are associated with corresponding data bricks. A data brick is associated with one or more data chunks. For each of the one or more data chunks associated with a data brick, the data brick stores information that associates an object offset for the data chunk with an extent for the data chunk and a chunk file identifier storing the data chunk. For example, a first data brick may indicate that a first data chunk having a chunk identifier of C1 is associated with an object offset of 0 MB-1 MB and has a data chunk size of 1 MB, a second data brick may indicate that a second data chunk having a chunk identifier of C2 is associated with an object offset of 1 MB-2 MB and has a data chunk of 1 MB, . . . , and an eighth data brick may indicate that an eighth data chunk identifier of C8 is associated with an object offset of 7 MB-8 MB and has a data chunk size of 1 MB.

After the storage system has performed the backup of the source system, the storage system performs post-processing deduplication because some of the data chunks written during data ingestion to the one or more storage devices associated with the storage system may be duplicative. Partial post-process deduplication may be performed when the storage system has sufficient resources and/or performing partial post-processing deduplication does not negatively affect a performance of the storage system. In contrast to the post-processing deduplication technique described above, the storage system analyzes the chunk file metadata data structure to identify chunk files that are storing duplicative data chunks.

The chunk file metadata data structure includes a plurality of entries. Each entry associates a chunk file identifier associated with a chunk file with one or more chunk identifiers corresponding to one or more data chunks stored in the chunk file and metadata associated with the chunk file corresponding to the chunk file identifier. The metadata may indicate that the chunk file needs to undergo partial post-processing deduplication because one or more data chunks were added to the chunk file having the chunk file identifier during data ingestion. For example, the metadata may include a bit that indicates one or more data chunks were added to the chunk file and that the chunk file needs to be post processed.

The storage system determines the entries that include metadata that indicates one or more data chunks were added to a chunk file during data ingestion. For the entries having metadata that indicates one or more data chunks were added to a chunk file during data ingestion, the storage system selects an entry and determines whether a chunk identifier associated with the entry is the same chunk identifier that is associated with one or more other entries. In the event a chunk identifier associated with a selected entry does not match a chunk identifier associated with the one or more other entries, the storage system updates the chunk metadata data structure to include an entry that associates the chunk identifier associated with the selected entry with the chunk file identifier associated with the selected entry. In the event a chunk identifier associated with a selected entry matches a chunk identifier associated with the one or more other entries, the storage system updates the chunk metadata data structure to include an entry that associates the chunk identifier associated with the selected entry with the chunk file identifier associated with the selected entry, deletes the data chunk having the chunk identifier from the one or more chunk files corresponding to the one or more entries of the chunk file metadata data structure, and updates the one or more entries of the chunk file metadata structure to not reference the deleted data chunk (e.g., delete the chunk identifier from the entry). In some embodiments, duplicate copies of a data chunk appear in the same chunk file and the storage system determines whether a chunk identifier associated with the entry is the same chunk identifier that is associated with one or more other entries and the same chunk identifier as any other data chunks in the chunk file corresponding to the entry.

The storage system repeats the above process until all of the entries of the chunk file metadata data structure having metadata that indicates one or more data chunks were added to a chunk file during data ingestion have been analyzed. As a result, the storage system is able to perform partial post-processing deduplication without having to re-chunk the data chunks for deduplication purposes and re-write the re-chunked data chunks. This reduces the bottleneck associated with in-line deduplication and allows the storage system to perform partial post-processing deduplication at a time when the storage system has sufficient resources to perform partial post-processing deduplication without affecting a performance of one or more other processes performed by the storage system.

FIG. 1 is a block diagram illustrating an embodiment of a system for performing deduplication. In the example shown, system 100 includes a source system 102 and a storage system 112. Source system 102 is coupled to storage system 112 via connection 110. Connection 110 may be a wired or wireless connection. Connection 110 may be a LAN, WAN, intranet, the Internet, and/or a combination thereof.

Source system 102 is a computing system that stores file system data. The file system data may include a plurality of files (e.g., content files, text files, etc.) and metadata associated with the plurality of files. Source system 102 may be comprised of one or more servers, one or more computing devices, one or more storage devices, and/or a combination thereof. A backup of source system 102 may be performed according to one or more backup policies. In some embodiments, a backup policy indicates that file system data is to be backed up on a periodic basis (e.g., hourly, daily, weekly, monthly, etc.), when a threshold size of data has changed, or in response to a command from a user associated with source system 102.

Source system 102 may be configured to run one or more objects 103. Examples of objects include, but are not limited to, a virtual machine, a database, an application, a container, a pod, etc. Source system 102 may include one or more storage volumes (not shown) that are configured to store file system data associated with source system 102. The file system data associated with source system 102 includes the data associated with the one or more objects 103.

Backup agent 104 may be configured to cause source system 102 to perform a backup (e.g., a full backup or incremental backup). A full backup may include all of the file system data of source system 102 at a particular moment in time. In some embodiments, a full backup for a particular object of the one or more objects 103 is performed and the full backup of the particular object includes all of the object data associated with the particular object at a particular moment in time. An incremental backup may include all of the file system data of source system 102 that has not been backed up since a previous backup. In some embodiments, an incremental backup for a particular object of the one or more objects 103 is performed and the incremental backup of the particular object includes all of the object data associated with the particular object that has not been backed up since a previous backup.

In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more objects 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without the backup agent 104.

Storage system 112 is comprised of a storage cluster that includes a plurality of storage nodes 111, 113, 115. Although three storage nodes are shown, storage system 112 may be comprised of n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. The plurality of storage devices may include one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

Storage system 112 may be a cloud instantiation of a storage system. A configuration of cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of storage system.

Storage system 112 performs a data management operation (e.g., backup, replication, tiering, migration, archive, etc.) for source system 102 by ingesting data from source system 102 and storing a cohort of data as a plurality of data chunks in one or more chunk files that are stored in one or more storage devices associated with one or more storage nodes 111, 113, 115 of storage system 112. A technique to deduplicate data by performing partial in-line deduplication and partial post-processing deduplication is disclosed herein. Although the technique is described with respect to backup, the technique disclosed herein may be applicable whenever a data management operation (e.g., backup, migration, replication, archive, etc.) is performed for a cohort of data that is provided from a first system to a second system. In some embodiments, deduplication is performed based on object type (e.g., all VM data chunks are deduplicated against each other, all database data chunks are deduplicated against each other, etc.).

Storage system 112 includes a file system manager 117 that is configured to organize the file system data of the backup using a tree data structure. An example of the tree data structure is a snapshot tree, which may be based on a B+ tree structure (or other type of tree structure in other embodiments). Storage system 112 may store a plurality of tree data structures in metadata store 114, which is accessible by storage nodes 111, 113, 115. Storage system 112 may generate a snapshot tree and one or more metadata structures for each backup.

In the event the backup corresponds to all of the file system data of source system 102, a view corresponding to the backup may be comprised of a snapshot tree and one or more object metadata structures. The snapshot tree may be configured to store the metadata associated with source system 102. An object metadata structure may be configured to store the metadata associated with one of the one or more objects 103. Each of the one or more objects 103 may have a corresponding metadata structure.

In the event the backup corresponds to all of the object data of one of the one or more objects 103 (e.g., a backup of a virtual machine), a view corresponding to the backup may be comprised of a snapshot tree and one or more object file metadata structures. The snapshot tree may be configured to store the metadata associated with one of the one or more objects 103. An object file metadata structure may be configured to store the metadata associated with an object file included in the object.

The tree data structure may be used to capture different views of data. A view of data may correspond to a full backup, an incremental backup, a clone of data, a file, a replica of a backup, a backup of an object, a replica of an object, a tiered object, a tiered file, etc. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of source system 102, an object 103, or data generated on or by the storage system 112 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with source system 102, an object at a particular time and the file's contents, or a file generated on or by storage system 112, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure.

A leaf node of a metadata structure may store information, such as an identifier of a data brick associated with one or more data chunks and information associated with the one or more data chunks. The information associated with the one or more data chunks may include an object offset, an extent reference for a data chunk, and/or a chunk file identifier associated with a data chunk. The location of the one or more data chunks associated with a data brick may be identified using a plurality of data structures (e.g., list, table, etc.) stored in metadata store 114. A first data structure (e.g., chunk metadata data structure) may store information that associates a plurality of chunk identifiers with corresponding chunk file identifiers. Each of the chunk identifiers included in the first data structure is deduplicated, that is, the first data structure only includes a single entry for each of the chunk identifiers. The first data structure identifies the plurality of data chunks that were already stored by storage system 112 before a backup of source system 102 started. A second data structure (e.g., chunk file metadata data structure) includes a plurality of entries and each entry stores information that associates a chunk file identifier associated with a chunk file with one or more corresponding chunk identifiers corresponding to one or more data chunks stored in the chunk file and metadata associated with the chunk file to which the chunk file identifier is associated. The second data structure is updated by storage system 112 during a backup of source system 102 and may include multiple entries that include the same chunk identifier after the data is ingested, but before partial post-processing deduplication has started.

In some embodiments, duplicate copies of data chunks may be included within the backup of source system 102. In some embodiments, duplicate copies of data chunks may be included across a plurality of backups of source system 102. For example, duplicate copies of data chunks may be included across a plurality of backups of source system 102. Storage system 112 may deduplicate the data chunks to improve storage utilization of storage nodes 111, 113, 115 by removing duplicate copies of a data chunk and storing a single copy of the data chunk.

In some embodiments, storage system 112 ingests data from source system 102 and chunks the ingested data into a plurality of data chunks, and stores the plurality of data chunks in a memory of one or more of the storage nodes 111, 113, 115. In some embodiments, the data chunks are variable sized. In some embodiments, the data chunks are a fixed sized. Storage system 112 generates a corresponding chunk identifier for each of the data chunks.

During the data ingestion, storage system 112 performs partial in-line deduplication by deduplicating data chunks included in a backup with respect to data chunks already stored by storage system 112, not with respect to other data chunks included in the same backup. Storage system 112 verifies whether the corresponding chunk identifier is stored in the chunk metadata data structure. The chunk metadata data structure identifies the plurality of data chunks that were already stored by storage system 112 before the backup of source system 102 started.

In some embodiments, storage system 112 performs partial in-line deduplication by deduplicating data chunks included in a backup with respect to data chunks stored in a plurality of storage systems (e.g., a first storage system is located in a first datacenter located at a first location and a second storage system is located in a second data center located at a second location). In the event the corresponding chunk identifier is stored in the chunk metadata data structure, then storage system 112 does not store the data chunk in a storage device of storage system 112. Instead, storage system 112 stores a reference to a storage location of the already stored data chunk and deletes the data chunk from the memory. In the event the corresponding chunk identifier is not stored in the first data structure, then storage system 112 stores the data chunk in a chunk file that is stored in a storage device of storage system 112, updates the chunk file metadata data structure to indicate that the chunk file needs to undergo partial post-processing deduplication, and updates a node of a tree data structure to store a reference to the chunk file storing the data chunk.

In some embodiments, source system 102 chunks the data to be stored at storage system 112 into a plurality of data chunks, determines a corresponding chunk identifier (e.g., SHA-1 hash value) for each of the plurality of data chunks, and sends the chunk identifiers to storage system 112. In response, storage system 112 determines whether the received chunk identifiers are stored in the chunk metadata data structure. In the event a corresponding chunk identifier is stored in the chunk metadata data structure, then storage system 112 does not request the data chunk from source system 102. In the event the corresponding chunk identifier is not stored in the chunk metadata data structure, then storage system 112 requests the data chunk from source system 102, receives and stores the data chunk in a chunk file that is stored in a storage device of storage system 112, updates a chunk file metadata data structure to indicate that the chunk file needs to undergo partial post-processing deduplication, and updates a node of a tree data structure to store a reference to the chunk file storing the data chunk.

During data ingestion, storage system 112 updates a chunk file metadata data structure when a data chunk is written to a chunk file and generates, as described herein, a tree data structure that enables data chunks included in the ingested data to be located. Storage system 112 maintains a chunk file metadata data structure that associates a chunk file identifier with one or more chunk identifiers. This indicates the one or more data chunks that are stored in the chunk file having the chunk file identifier. The chunk file metadata data structure is updated to associate a chunk file identifier with one or more chunk identifiers corresponding to one or more data chunks that were stored during the data ingestion.

After storage system 112 has performed a backup of source system 102, storage system 112 performs partial post-processing deduplication because some of the data chunks written to the one or more storage devices associated with storage system 112 may be duplicates. Storage system 112 may perform partial post-processing deduplication after one or more backups of source system 102 have been performed because storage system 112 may have stored duplicate copies of a data chunk during data ingestion. Partial post-process deduplication may be performed when storage system 112 has sufficient resources and/or performing partial post-processing deduplication does not negatively affect a performance of storage system 112.

Storage system 112 analyzes the chunk file metadata data structure to identify chunk files that are storing duplicative data chunks. Storage system 112 determines the entries of the chunk file metadata data structure that include metadata that indicates one or more data chunks were added to a chunk file during data ingestion. For the entries having metadata that indicates one or more data chunks were added to a chunk file during data ingestion, storage system 112 selects an entry and determines whether a chunk identifier associated with the entry is the same chunk identifier that is associated with one or more other entries. In the event a chunk identifier associated with a selected entry does not match a chunk identifier associated with the one or more other entries, storage system 112 updates the chunk metadata data structure to include an entry that associates the chunk identifier associated with the selected entry with the chunk file identifier associated with the selected entry. In the event a chunk identifier associated with a selected entry matches a chunk identifier associated with the one or more other entries, storage system 112 updates the chunk metadata data structure to include an entry that associates the chunk identifier associated with the selected entry with the chunk file identifier associated with the selected entry, deletes the data chunk having the chunk identifier from the one or more chunk files corresponding to the one or more other entries of the chunk file metadata data structure, and updates the one or more other entries of the chunk file metadata structure to not reference the deleted data chunk (e.g., delete the chunk identifier from the entry). The storage system repeats the above process until all of the entries of the chunk file metadata data structure having metadata that indicates one or more data chunks were added to a chunk file during data ingestion have been analyzed.

Figure 2A:
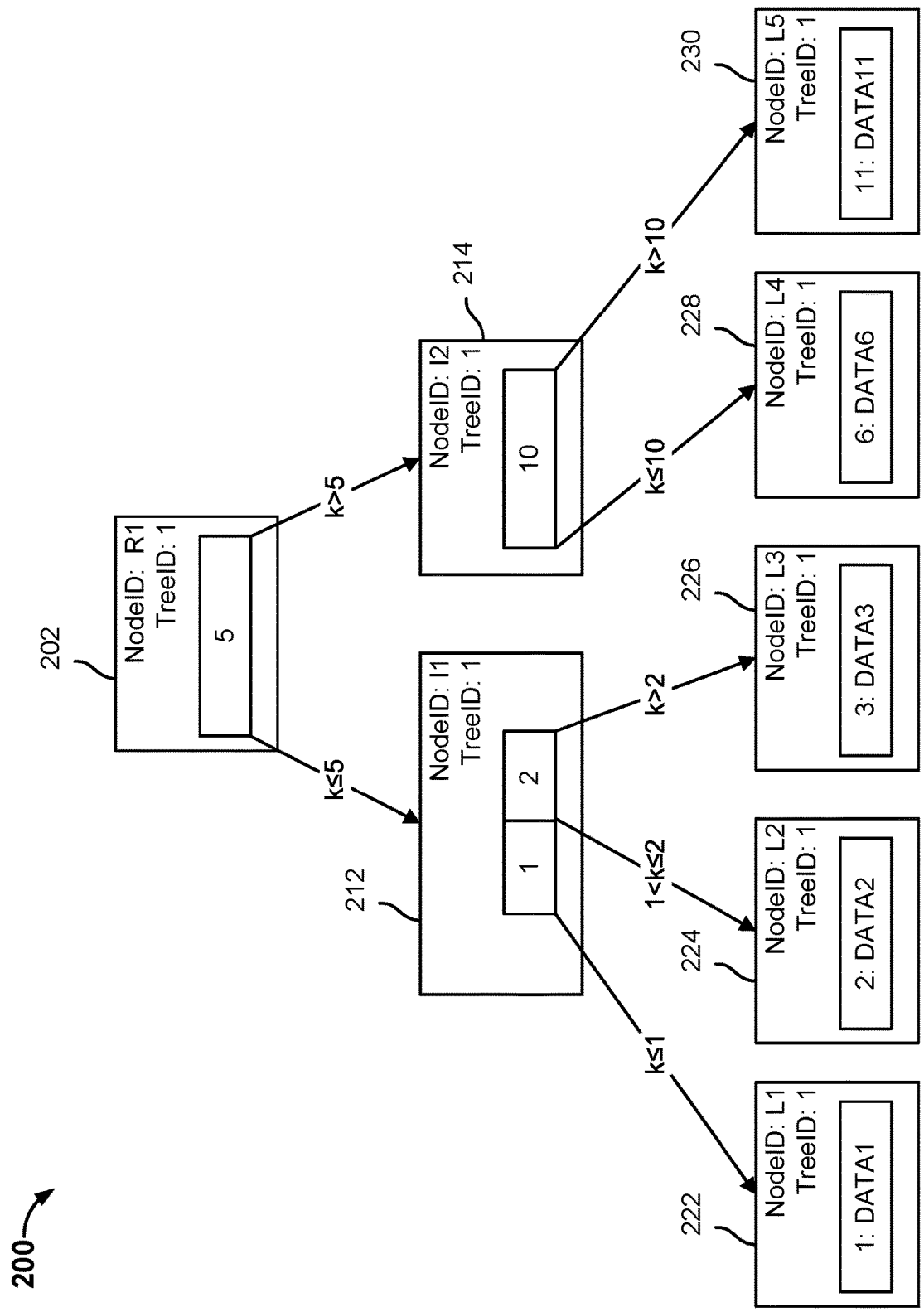
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as storage system 112. The file system data may include metadata for a distributed file system and may include information, such as chunk identifier, chunk offset, file size, directory structure, file permissions, physical storage locations of the content files, etc. A file system manager, such as file system manager 117, may generate tree data structure 200 in response to ingesting a cohort of data from a source system. Tree data structure 200 may correspond to a full backup of a source system. Tree data structure 200 may correspond to a replica of the file system data stored on the source system. Tree data structure 200 may correspond to some or all of the file system data stored on the source system that is tiered to the storage system.

Tree data structure 200 is comprised of a snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup of file system data at a particular point in time, for example, at time to. The backup may be received from a source system, such as source system 102. The snapshot tree in conjunction with a plurality of metadata structures may provide a complete view of the source system associated with the backup for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node of the snapshot tree that does not have child nodes of the snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key. In some embodiments, a leaf node is configured to store the data associated with a content file when the data is less than or equal to a limit size (e.g., 256 kB). In some embodiments, a leaf node includes a pointer to a metadata structure (e.g., blob structure) when the size of data associated with a content file, object, or object file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate node 212 and intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than or equal to the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 214 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf nodes 222, 224, 226, 228, 230 include respective data key-value pairs of "1: DATA1," "2: DATA2," "3: DATA3," "6: DATA6," "11: DATA11." Leaf nodes 222, 224, 226, 228, 230 include respective Node IDs of "L1," "L2," "L3," "L4," "L5." Leaf nodes 222, 224, 226, 228, 230 all include a TreeID of "1." In some embodiments, leaf nodes 222, 224, 226, 228, or 230 are configured to store metadata. In other embodiments, leaf nodes 222, 224, 226, 228, or 230 are configured to store content file data when the size of the content file is less than or equal to a limit size. In other embodiments, leaf nodes 222, 224, 226, 228, or 230 are inodes and are configured to store a pointer to or an identifier of a respective object metadata structure (e.g., object metadata tree).

Figure 2B:
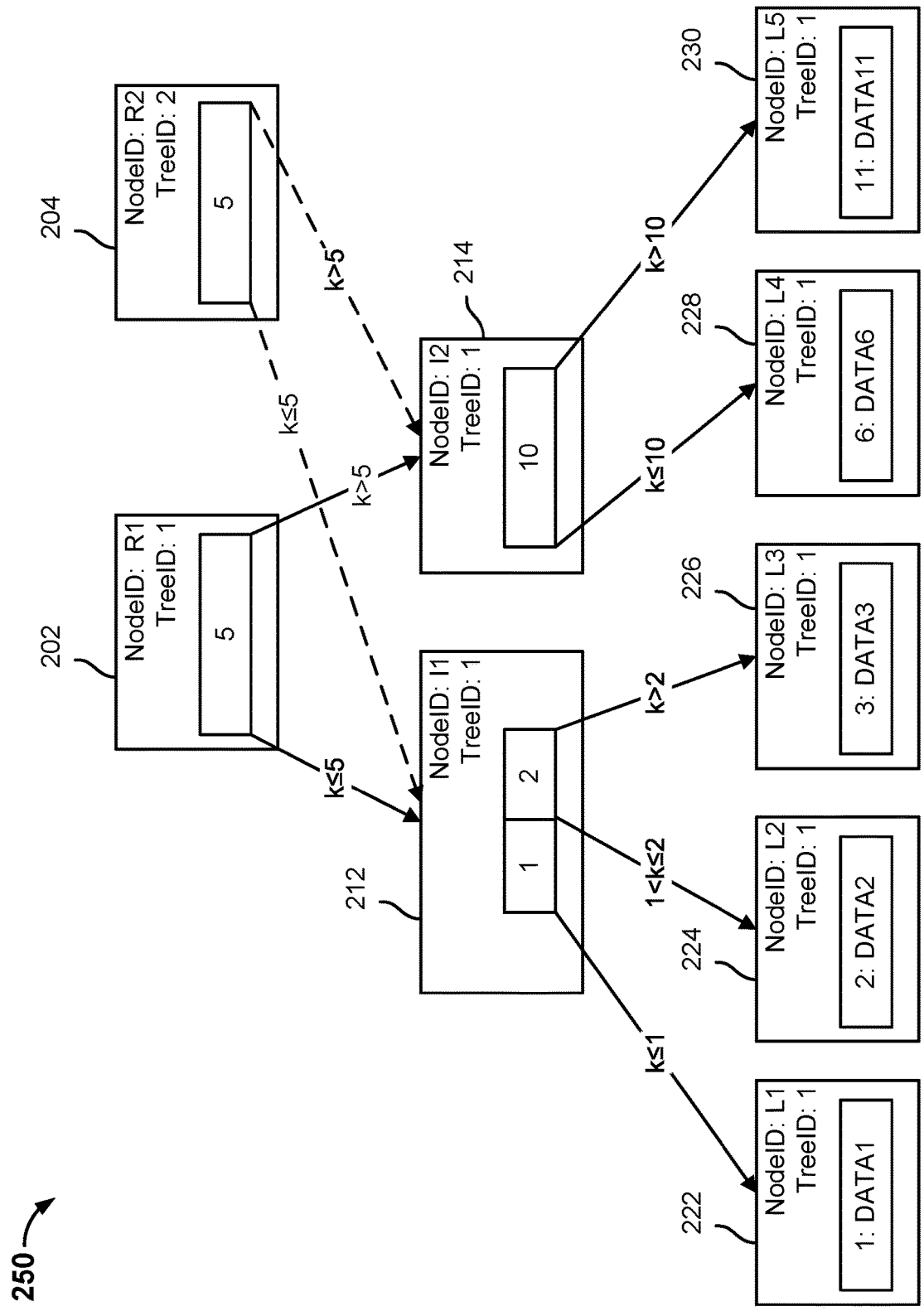
FIG. 2B is a block diagram illustrating an embodiment of a cloned tree data structure.

FIG. 2B is a block diagram illustrating an embodiment of a cloned tree data structure. A snapshot tree may be cloned when a snapshot tree is added to a tree data structure, when data associated with a snapshot tree is migrated, when data associated with a snapshot tree is restored, when data associated with a snapshot tree is replicated, when data associated with a snapshot tree is used for test/development purposes, etc. In some embodiments, tree data structure 250 may be created by a storage system, such as storage system 112. A subsequent backup may correspond to an incremental backup. The manner in which the file system data corresponding to the subsequent backup is stored in a storage system may be represented by a tree data structure. The tree data structure corresponding to the subsequent backup is generated in part by cloning a snapshot tree associated with a previous backup.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a snapshot is performed, a new root node may be created and the new root node includes the same set of pointers included in the previous root node, that is the new root node of the snapshot tree may be linked to one or more intermediate nodes associated with a previous snapshot tree. The new root node also includes a different NodeID and a different TreeID.

In some embodiments, a root node is associated with a current view of the file system data. A current view may still accept one or more changes to the data. In the example shown, root node 204 is associated with a current view of the file system data. In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a snapshot tree corresponding to an incremental backup snapshot at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
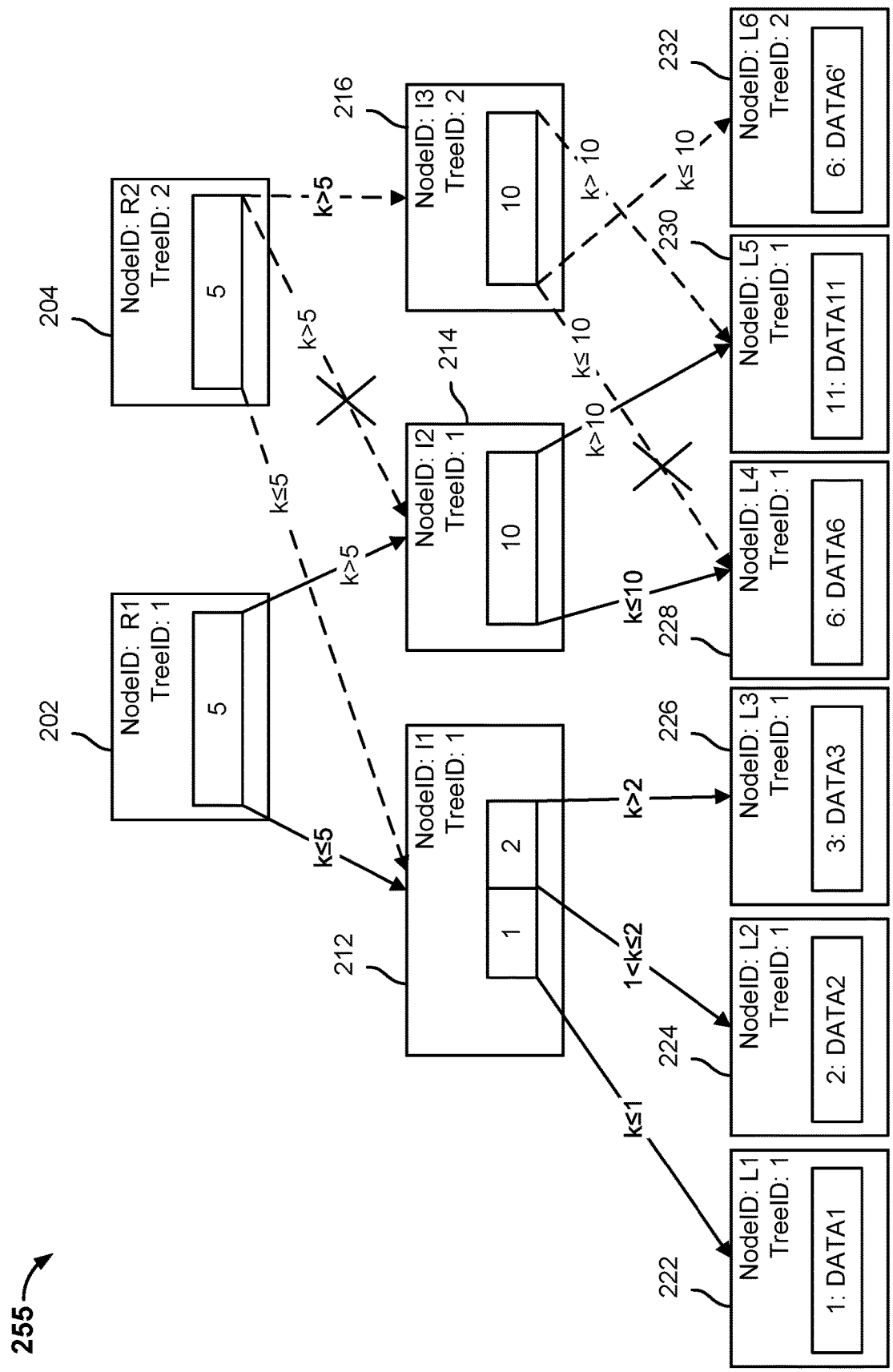
FIG. 2C is a block diagram illustrating an embodiment of modifying a cloned tree data structure.

FIG. 2C is a block diagram illustrating an embodiment of modifying a cloned tree data structure. In the example shown, tree data structure 255 may be modified by a file system manager, such as file system manager 117. A snapshot tree with a root node 204 may be a current view of the file system data, for example, at time $t_1$.

In the example shown, the value "DATA6" has been modified to be "DATA6." In some embodiments, the value of a key value pair has been modified. In other embodiments, the value of the key value pair is the file data associated with a content file that is smaller than or equal to a limit size. In other embodiments, the value of the key value pair points to a different metadata structure (e.g., a metadata structure corresponding to a different version of a file). The different metadata structure may be a modified version of the metadata structure to which the leaf node previously pointed.

To modify the snapshot tree at $t_1$, the file system manager starts at root node 204 because that is the root node associated with the snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA6'" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In other embodiments, leaf node 232 stores the modified data associated with a content file that is smaller than or equal to a limit size.

Figure 2D:
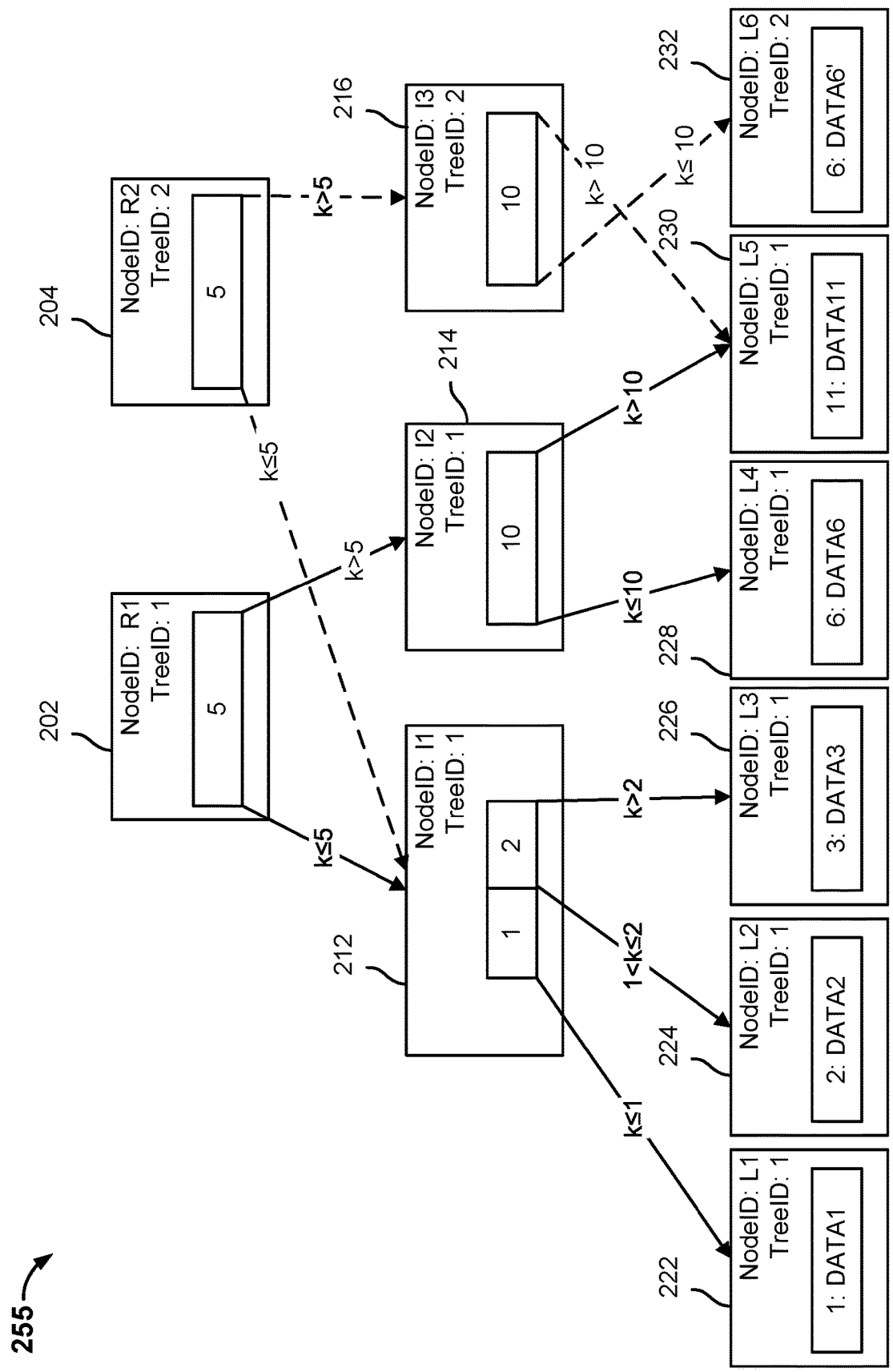
FIG. 2D is a block diagram illustrating an embodiment of a modified tree data structure.

FIG. 2D is a block diagram illustrating an embodiment of a modified tree data structure. Tree data structure 255 shown in FIG. 2D illustrates a result of the modifications made to a snapshot tree as described with respect to FIG. 2C.

Figure 3A:
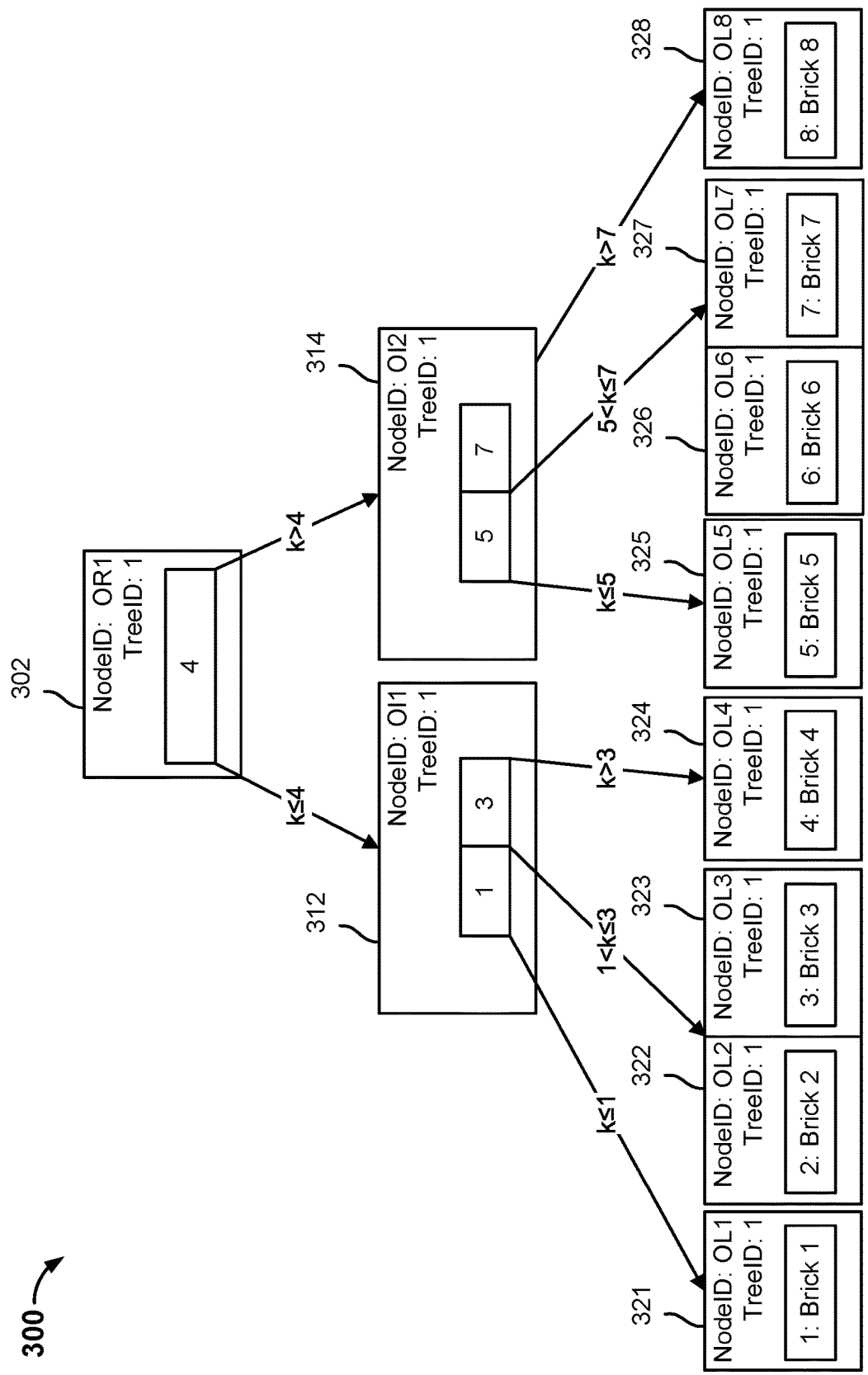
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. Tree data structure 300 may be used to store the metadata associated with an object, an object file, or a content file. Tree data structure 300 may be referred to as a metadata structure, an object file metadata structure, or a file metadata structure. In the example shown, tree data structure 300 corresponds to the contents of an object file.

A leaf node of a snapshot tree associated with file system data, such as a leaf node of tree data structures 200, 250, 255, may include a pointer to a tree data structure that stores metadata corresponding to an object file, such as tree data structure 300. A tree data structure corresponding to an object file and storing the file metadata associated with the object file is a snapshot tree, but is used to organize the data chunks associated with the object file (e.g., data components) that are stored on the storage system.

A tree data structure corresponding to an object file at a particular point in time (e.g., a particular version) may be comprised of a root node, one or more levels of one or more intermediate nodes, and one or more leaf nodes. In some embodiments, a tree data structure corresponding to an object file is comprised of a root node and one or more leaf nodes without any intermediate nodes. Tree data structure 300 may be a snapshot of an object file at a particular point in time t, for example at time to. Tree data structure 300 may correspond to a full backup of the object file.

In the example shown, tree data structure 300 includes object root node 302, object intermediate nodes 312, 314, and object leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the content file). Root node 302 includes pointers to intermediate nodes 312, 314. Root node 302 includes a NodeID of "OR1" and a TreeID of "1."

In the example shown, intermediate node 312 includes respective pointers to leaf nodes 321, 322, 323, 324. Intermediate node 312 includes a NodeID of "OI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "OI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a content file corresponding to tree data structure 300. Leaf node 321 includes a NodeID of "OL1" and a TreeID of "1."

Leaf node 322 includes a data key-value pair of "2: Brick 2." "Brick 2" is a brick identifier that identifies the data brick associated with one or more data chunks of a content file corresponding to tree data structure 300. Leaf node 322 includes a NodeID of "OL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of an object file corresponding to tree data structure 300. Leaf node 323 includes a NodeID of "OL3" and a TreeID of "1."

Leaf node 324 includes a data key-value pair of "4: Brick 4." "Brick 4" is a brick identifier that identifies the data brick associated with one or more data chunks of an object file corresponding to tree data structure 300. Leaf node 324 includes a NodeID of "OL4" and a TreeID of "1."

Leaf node 325 includes a data key-value pair of "5: Brick 5." "Brick 5" is a brick identifier that identifies the data brick associated with one or more data chunks of an object file corresponding to tree data structure 300. Leaf node 325 includes a NodeID of "OL5" and a TreeID of "1."

Leaf node 326 includes a data key-value pair of "6: Brick 6." "Brick 6" is a brick identifier that identifies the data brick associated with one or more data chunks of an object file corresponding to tree data structure 300. Leaf node 326 includes a NodeID of "OL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a content file corresponding to tree data structure 300. Leaf node 327 includes a NodeID of "OL7" and a TreeID of "1."

Leaf node 328 includes a data key-value pair of "8: Brick 8." "Brick 8" is a brick identifier that identifies the data brick associated with one or more data chunks of a content file corresponding to tree data structure 300. Leaf node 328 includes a NodeID of "OL8" and a TreeID of "1."

An object file may be comprised of one or more chunk files. A chunk file is comprised of a plurality of data chunks. A brick may be associated with one or more data chunks. In the example shown, leaf nodes 321, 322, 323, 324, 325, 326, 327, 328 each store a corresponding brick identifier. For each of the one or more data chunks associated with a data brick, the data brick stores information that associates an object offset for the data chunk with an extent for the data chunk and a chunk file identifier storing the data chunk.

Figure 3B:
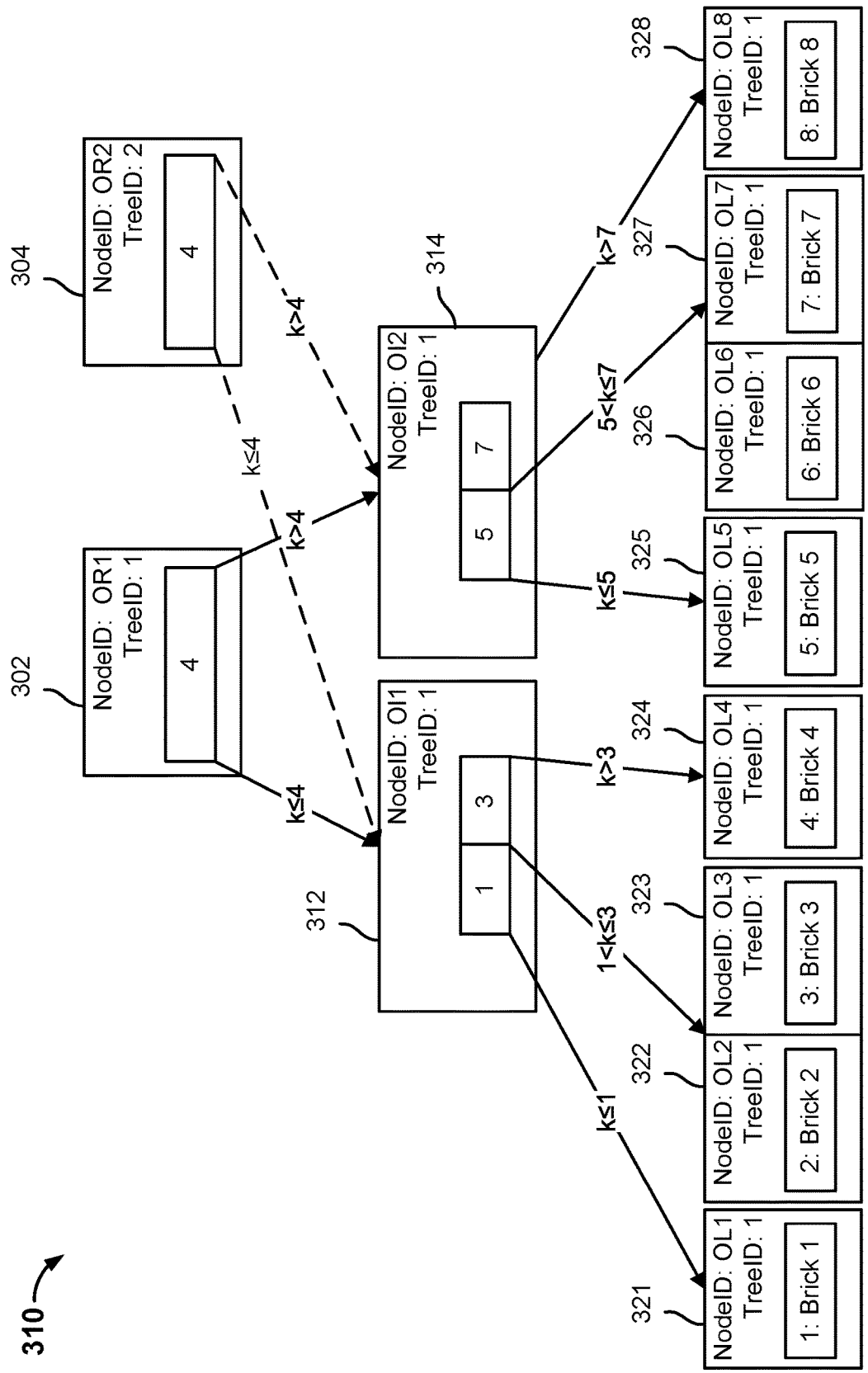
FIG. 3B is a block diagram illustrating an embodiment of a cloned tree data structure.

FIG. 3B is a block diagram illustrating an embodiment of a cloned tree data structure. A metadata structure may be cloned when a subsequent version of an object, an object file, or a content file is stored on a storage system. In some embodiments, tree data structure 310 may be created by a storage system, such as storage system 112. In the example shown, tree data structure 310 corresponds to an object file, but stores metadata associated with the object file. The tree data structure can be used to capture different versions of an object, an object file, or a content file at different moments in time. The metadata structure corresponding to a subsequent version of an object, an object file, or a content file may be generated in part by cloning the metadata structure corresponding to a previous version of an object, an object file, or a content file.

A root node or an intermediate node of a version of a metadata structure may reference an intermediate node or a leaf node of a previous version of a metadata structure. Similar to the snapshot tree, the metadata structure allows different versions of an object, an object file, or a content file to share nodes and allows changes to be tracked. When a backup snapshot is received, a root node of the metadata structure may be linked to one or more intermediate nodes associated with a previous metadata structure. This may occur when data associated with an object, an object file, or a content file is included in a plurality of backups.

In the example shown, tree data structure 310 includes a first metadata structure comprising root node 302, intermediate nodes 312, 314, and leaf nodes 321, 322, 323, 324, 325, 326, 327, 328. Tree data structure 310 also includes a second metadata structure that may be a snapshot of object data at a particular point in time, for example at time $t_1$. The second metadata structure is comprised of root node 304, intermediate nodes 312, 314, and leaf nodes 321, 322, 323, 324, 325, 326, 327, 328. To create a snapshot of the object data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the metadata structure at a particular moment in time. The TreeID of a root node indicates a view with which the root node is associated (e.g., content file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing a metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a metadata structure included in tree data structure 310 from root node 304 to intermediate node 314 leads to a leaf node with a data key of "5," "6," "7," or "8." Root node 304 includes a NodeID of "OR2" and a TreeID of "2."

Figure 3C:
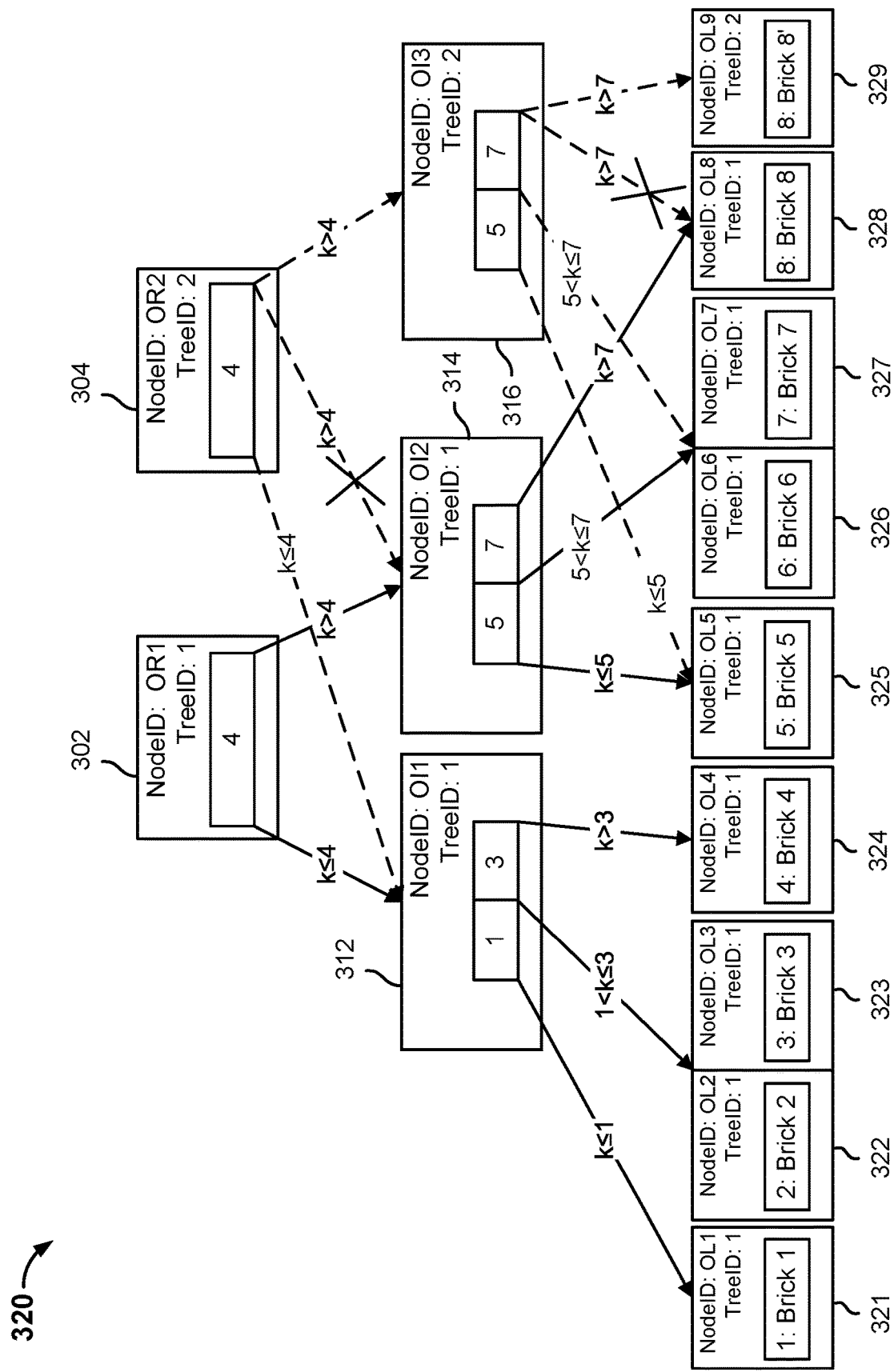
FIG. 3C is a block diagram illustrating an embodiment of modifying a cloned tree data structure.

FIG. 3C is a block diagram illustrating an embodiment of modifying a cloned tree data structure. Tree data structure 320 is comprised of a first metadata structure that includes root node 302 and a second metadata structure that includes root node 304. In the example shown, tree data structure 320 may be modified by a file system manager, such as file system manager 117.

In some embodiments, the content data associated with an object file may be modified such that one of the data chunks is replaced by another data chunk. When a data chunk of content data associated with a previous backup snapshot is replaced with a new data chunk, the data brick associated with the new data chunk may be different. To represent this modification to the object data, a corresponding modification is made to a current view of a metadata structure. The data chunk of the content data that was replaced has a corresponding leaf node in the previous metadata structure. A new leaf node in the current view of the metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
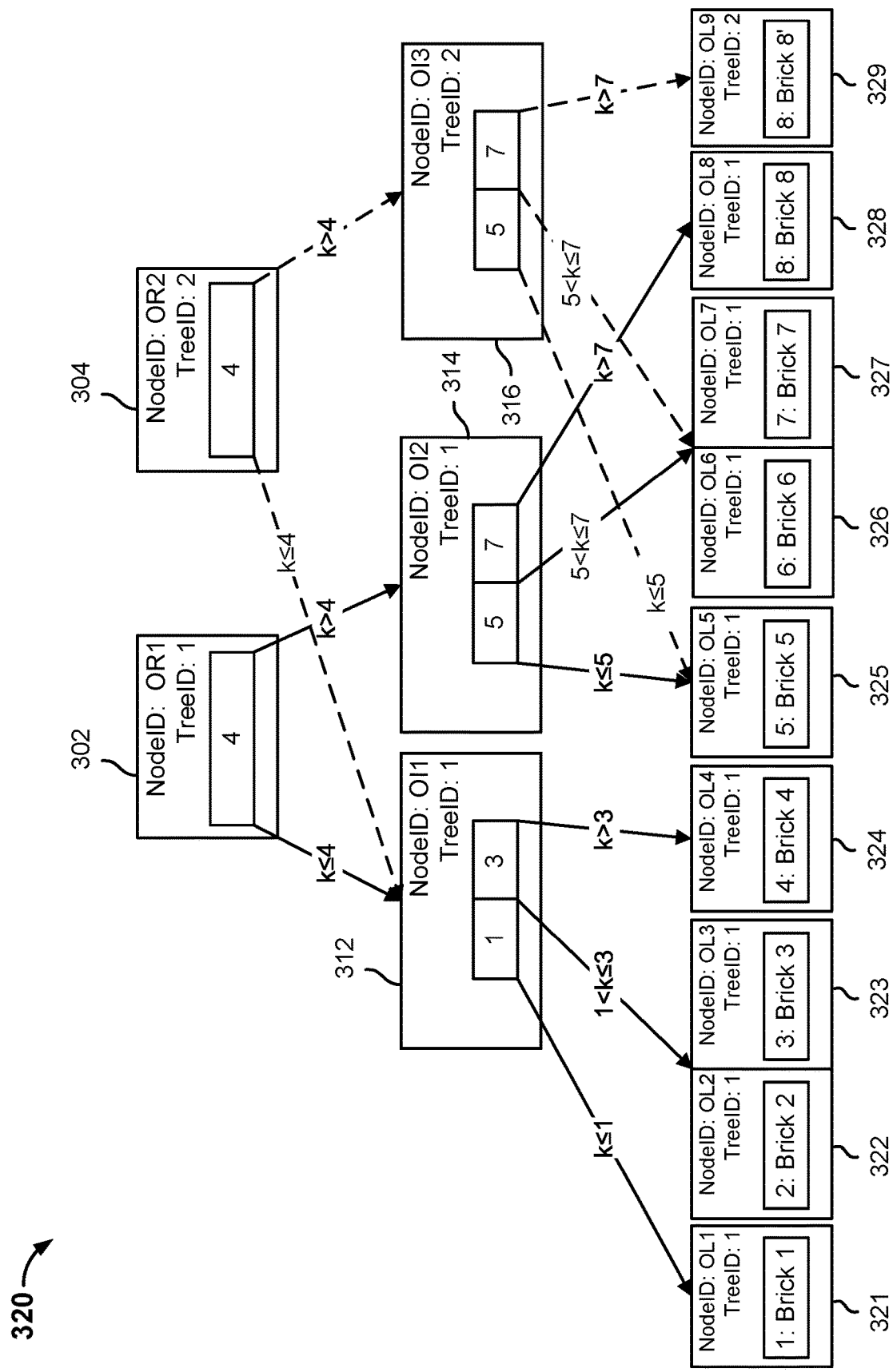
FIG. 3D is a block diagram illustrating an embodiment of a modified metadata structure.

FIG. 3D is a block diagram illustrating an embodiment of a modified metadata structure. The tree data structure 320 shown in FIG. 3D illustrates a result of the modifications made to tree data structure 320 as described with respect to FIG. 3C.

FIG. 4A is a diagram illustrating a data structure in accordance with some embodiments. Data structure 400 may be stored by a storage system, such as storage system 112, in a metadata store, such as metadata store 114. In some embodiments, data structure 400 corresponds to a chunk metadata data structure. In the example shown, chunk metadata table 400 is configured to associate a chunk identifier corresponding to a data chunk and a chunk file identifier corresponding to a chunk file storing the data chunk.

In the example shown, data structure 400 identifies the plurality of data chunks that are stored by a storage system. During data ingestion, a storage system may utilize data structure 400 to determine whether to store a data chunk. Data structure 400 is not updated during data ingestion. Instead, data structure 400 is updated via a partial post-processing deduplication process. After the partial post-processing deduplication process is finished, data structure 400 only stores a single entry for each chunk identifier.

Data structure 400 includes a plurality of entries that indicate the storage system stores data chunks having corresponding chunk identifiers of "SHA-$1_a$", "SHA-$1_b$", "SHA-$1_c$", "SHA-$1_d$", "SHA-$1_e$", "SHA-$1_f$", "SHA-$1_g$", and "SHA-$1_h$".

Data structure 400 indicates that a chunk file having a chunk file ID of "1" stores a data chunk having chunk identifiers of "SHA-1a", a data chunk that has a chunk identifier of "SHA-$1_b$", a data chunk that has a chunk identifier of "SHA-$1_e$", and a data chunk that has a chunk identifier of "SHA-$1_a$". Data structure 400 indicates that a chunk file having a chunk file ID of "2" stores a data chunk that has a chunk identifier of "SHA-$1_e$", a data chunk that has a chunk identifier of "SHA-$1_f$", a data chunk that has a chunk identifier of "SHA-$1_g$", and a data chunk that has a chunk identifier of "SHA-$1_h$".

FIG. 4B is a diagram illustrating a data structure in accordance with some embodiments. Data structure 425 may be stored by a storage system, such as storage system 112, in a metadata store, such as metadata store 114. In some embodiments, data structure 425 corresponds to a chunk file metadata data structure.

In the example shown, data structure 425 associates a chunk file identifier corresponding to a chunk with one or more chunk identifiers corresponding to one or more data chunks stored in the chunk file and metadata associated with the chunk file. A chunk file is comprised of one or more data chunks. When data is ingested, the storage system writes a data chunk to a chunk file in the event the storage system determines that the data chunk is not already stored by the storage system using a chunk metadata data structure, such as data structure 400, and updates the metadata associated with the chunk file to indicate that the chunk file needs to undergo partial post-processing deduplication. In some embodiments, the ingested data includes duplicative data chunks.

In the example shown, the chunk files having chunk file IDs of "1" and "2" were stored by the storage system before a backup was started. The ingested data included data chunks having corresponding chunk identifiers of "SHA-$1_i$", "SHA-$1_j$", "SHA-$1_k$", "SHA-$1_l$", "SHA-$1_m$", "SHA-$1_n$", "SHA-$1_o$", and "SHA-$1_1$". The storage system utilized data structure 400 to determine that these data chunks are not stored by the storage system before the backup was started. The storage system wrote the data chunks having corresponding chunk identifiers of "SHA-$1_i$", "SHA-$1_j$", "SHA-$1_k$", and "SHA-$1_l$" to a chunk file having a chunk file identifier of "3" and wrote the data chunks having corresponding chunk identifiers of "SHA-$1_m$", "SHA-$1_n$", "SHA-$1_o$", and "SHA-$1_1$" to a chunk file having a chunk file identifier of "4". The metadata for chunk files having chunk identifiers of "3" and "4" was updated to indicate that these chunk files are subject to post-processing (shown as an "x"). In this example, the data chunk having a chunk identifier of "SHA-$1_1$" is duplicative.

A storage system comprised of a plurality of storage nodes may store redundant copies of a chunk file across the nodes. This may ensure access to the chunk file in the event a storage node of the storage system goes offline. Data structure 425 is configured to store this metadata to enable the chunk file to be retrieved in response to an object request. In the example shown, a chunk file having a chunk file identifier of "1" is stored on storage node 1 and storage node 3, a chunk file having a chunk file identifier of "2" is stored on storage node 2 and storage node 4, a chunk file having a chunk file identifier of "3" is stored on storage node 2 and storage node 3, and a chunk file having a chunk file identifier of "4" is stored on storage node 1 and storage node 4.

A chunk file may be associated with a primary owner. The primary owner may correspond to the original metadata structure that includes references to the data chunks included in the chunk file. For example, a backup of a source system may include a first content file. The storage system may ingest the first content file, chunk the data associated with the first content file into a plurality of data chunks, and store the plurality of data chunks associated with the first content file in one or more chunk files. The storage system may generate a first metadata structure corresponding to the first content file. In other embodiments, the primary owner corresponds to the original content file that is associated with the chunk file. The primary owner metadata is updated when a chunk file is created during data ingestion. In the example shown, the metadata structure corresponding to "File 1" is the primary owner of chunk files having chunk file identifiers of "1" and "2", the metadata structure corresponding to "File 2" is the primary owner of a chunk file having a chunk file identifier of "3", the metadata structure corresponding to "File 3" is the primary owner of a chunk file having a chunk file identifier of "4."

FIG. 4C is a diagram illustrating a data structure in accordance with some embodiments. Data structure 450 may be stored by a storage system, such as storage system 112, in a metadata store, such as metadata store 114. In some embodiments, data structure 450 corresponds to a chunk metadata data structure.

In the example shown, data structure 450 is an updated version of data structure 400 after partial post-processing deduplication has been performed. Data structure 450 indicates that after partial post-processing deduplication has been performed, the storage system stores data chunks having corresponding chunk identifiers of "SHA-1$_a$", "SHA-1$_b$", "SHA-1$_c$", "SHA-1$_d$", "SHA-1$_e$", "SHA-1$_f$", "SHA-1$_g$", "SHA-1$_h$", "SHA-1$_i$", "SHA-1$_j$", "SHA-1$_k$", "SHA-1$_l$", "SHA-1$_m$", "SHA-1$_n$", and "SHA-1$_o$".

After data ingestion was completed, as seen in FIG. 4B, the storage system stored two copies of a data chunk that has a chunk identifier of "SHA-1$_1$". After the partial post-process deduplication process, as described herein, the storage system stores a single instance of the data chunk that has a chunk identifier of "SHA-1$_1$".

FIG. 4D is a diagram illustrating a data structure in accordance with some embodiments. Data structure 475 may be stored by a storage system, such as storage system 112, in a metadata store, such as metadata store 114. In some embodiments, data structure 475 corresponds to a chunk file metadata data structure. In the example shown, data structure 475 associates a chunk file identifier with one or more chunk identifiers and metadata associated with a chunk file.

In the example shown, data structure 475 is an updated version of data structure 425 after partial post-processing deduplication has been performed. Data structure 475 indicates that after partial post-processing deduplication has been performed for chunk files having chunk identifiers of "3" and "4", the chunk file having a chunk file identifier of "3" stores data chunks having chunk identifiers of "SHA-1$_i$" "SHA-1$_j$", "SHA-1$_k$", and "SHA-1$_l$" and the chunk file having a chunk file identifier of "4" stores data chunks having chunk identifiers of "SHA-1$_m$", "SHA-1$_n$", and "SHA-1$_o$". The partial post-processing deduplication caused the data chunk having a chunk identifier of "SHA-1$_1$" to be deleted from the chunk file having a chunk identifier of "4".

Figure 5:
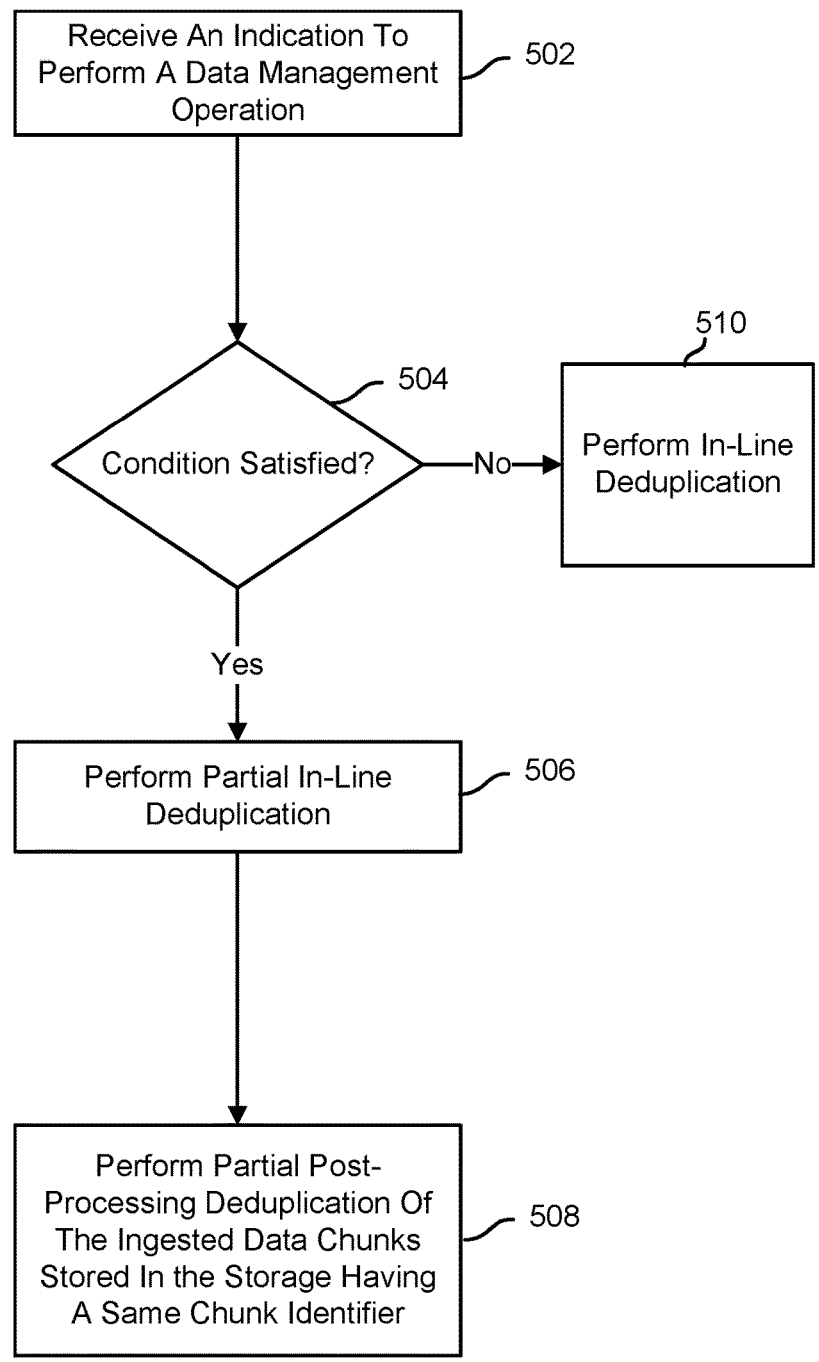
FIG. 5 is a flow diagram illustrating an embodiment of a process for performing deduplication.

FIG. 5 is a flow diagram illustrating an embodiment of a process for performing deduplication. In the example shown, process 500 may be implemented by a storage system, such as storage system 112.

At 502, an indication to perform a data management operation is received. The data management operation may be a backup of a source system, a replication of a source system, a tiering of one or more objects stored on the source system to a storage system, a migration of data from the source system to the storage system, an archive of data from the source system to the storage system, etc.

In some embodiments, the indication is received from the source system. In some embodiments, the indication is received from a client device associated with the source system. In some embodiments, the data management operation is initiated by the storage system.

At 504, it is determined whether one or more conditions are satisfied. In some embodiments, a condition is satisfied in the event the total amount of data to be ingested by the storage system during the data management operation is greater than or predicted to be greater than a threshold amount of data. In some embodiments, a condition is satisfied in the event CPU usage or a predicted CPU usage of the storage system during data ingestion exceeds a threshold CPU usage. In some embodiments, a condition is satisfied in the event the storage system is unable to meet a service level agreement by performing in-line deduplication.

In the event at least one of the one or more conditions is satisfied, process 500 proceeds to step 506. In the event at least one of the one or more conditions has not been satisfied, process 500 proceeds to step 510.

At 506, partial in-line deduplication is performed. During data ingestion, the storage system chunks the ingested data into a plurality of data chunks. In some embodiments, the data chunks are variable sized. In some embodiments, the data chunks are a fixed size. The storage system generates a corresponding chunk identifier for each of the data chunks.

In some embodiments, a source system chunks the data to be stored at the storage system into a plurality of data chunks, determines a corresponding chunk identifier (e.g., SHA-1 hash value) for each of the plurality of data chunks, and sends the chunk identifiers to the storage system.

The storage system verifies whether a corresponding chunk identifier is stored in the chunk metadata data structure. The chunk metadata data structure identifies the plurality of chunks that were already stored by the storage system before the data management operation started.

In contrast to the other storage systems performing in-line deduplication, during data ingestion, the storage system performs partial in-line deduplication by deduplicating data chunks included in a data management operation with respect to data chunks already stored by the storage system, not with respect to other data chunks ingested during the same data management operation. Deduplicating data chunks with respect to other data chunks ingested during the same data management operation can create a bottleneck for data ingestion. In the event the corresponding chunk identifier is stored in the chunk metadata data structure, the storage system does not store the data chunk in a storage device associated with the storage system. Instead, the storage system stores a reference to a storage location of the already stored data chunk and deletes the data chunk from a memory of the storage device (e.g., flash memory, random access memory, erasable programmable read only memory, etc.). In the event the corresponding chunk identifier is not stored in the chunk metadata data structure, the storage system stores the data chunk in a chunk file that is stored in a storage device associated with the storage system, updates a chunk file metadata data structure to indicate that the chunk file needs post-processing, and updates a node of a tree data structure to store a reference to the chunk file storing the data chunk. This removes the bottleneck associated with updating the chunk metadata data structure when performing in-line deduplication, but may cause duplicate copies of a data chunk included in the backup to be stored by the storage system.

In some embodiments, the storage system performs partial in-line deduplication by deduplicating data chunks included in a data management operation with respect to data chunks already stored by the storage system and with respect to some of the data chunks ingested during the same data management operation. During data ingestion, the storage system writes a first set of data chunks associated with a first object to a new chunk file and updates a chunk file metadata data structure to include an entry for the new chunk file that associates the chunk file identifier associated with the new chunk file with the first set of data chunks associated with the first object. For example, the chunk file metadata data structure may include an entry that associates the chunk file identifier of "CF1" with the first set of data chunks that include "C1, C2, . . . , C32." The storage system subsequently updates the chunk metadata data structure to include an entry that associates a chunk identifier associated with one of the data chunks included in the first set of data chunks with the chunk file identifier associated with the new chunk file, but does not update the chunk metadata data structure to include entries for the other data chunks included in the first set. For example, the chunk metadata data structure may be updated to include an entry that associates C1 with CF1.

During data ingestion, the storage system may receive a second set of data chunks associated with a second object. The second object may include data chunks that are the same as the data chunks included in the first object. For example, the second set of data chunks may include C1, C2, . . . , C32. The storage system may compare a chunk identifier associated with a first data chunk of the second set of data chunks (e.g., C1) to chunk identifiers included in the chunk metadata data structure. In some embodiments, the chunk identifier associated with the first data chunk of the second set of data chunks associated with the second object matches one of the chunk identifiers included in the chunk metadata data structure (e.g., the chunk identifier associated with the first data chunk of the first set of data chunks associated with the first object). In response, the storage system utilizes the chunk metadata data structure to identify the chunk file identifier corresponding to the chunk file storing the data chunk having the matching chunk identifier (e.g., the new chunk file).

The storage system subsequently compares the chunk identifiers associated with the data chunks included in the second set to the chunk identifiers included in the chunk file metadata data structure entry corresponding to the identified chunk file identifier. Similar to the partial in-line deduplication process described above, the storage system is configured to write any non-matching data chunks in the second set to a chunk file, update a chunk file metadata data structure to indicate that the chunk file needs post-processing, and update a node of a tree data structure to store a reference to the chunk file storing the data chunk. For any matching data chunks in the second set, the storage system does not store the data chunk in a storage device associated with the storage system. Instead, the storage system stores a reference to a storage location of the matching data chunk and deletes the matching data chunk from a memory of the storage device.

At 508, partial post-processing deduplication of the ingested data chunks stored in the storage having a same chunk identifier is performed. After the storage system has performed a backup of a source system, the storage system performs partial post-processing deduplication because some of the data chunks written to the chunk files stored in the one or more storage devices associated with the storage system may be duplicates. The storage system analyzes the chunk file metadata data structure to identify chunk files that are storing duplicative data chunks.

The chunk file metadata data structure includes a plurality of entries. Each entry associates a chunk file identifier with one or more chunk identifiers and metadata associated with a chunk file corresponding to the chunk file identifier. The metadata may indicate that one or more data chunks were added to the chunk file having the chunk file identifier during data ingestion. For example, the metadata may include a bit that indicates one or more data chunks were added to the chunk file and that the chunk file needs to be post processed.

The storage system determines the entries that include metadata that indicates one or more data chunks were added to a chunk file during data ingestion. For the entries having metadata that indicates one or more data chunks were added to a chunk file during data ingestion, the storage system selects an entry and determines whether a chunk identifier associated with the entry is the same chunk identifier that is associated with one or more entries. In the event a chunk identifier associated with a selected entry does not match a chunk identifier associated with the one or more other entries the storage system updates the chunk metadata data structure to include an entry that associates the chunk identifier associated with the selected entry with the chunk file identifier associated with the selected entry. In the event a chunk identifier associated with a selected entry matches a chunk identifier associated with the one or more other entries, the storage system updates the chunk metadata data structure to include an entry that associates the chunk identifier associated with the selected entry with the chunk file identifier associated with the selected entry, deletes the data chunk having the chunk identifier from the one or more chunk files corresponding to the one or more other entries of the chunk file metadata data structure, and updates the one or more other entries of the chunk file metadata structure to not reference the deleted data chunk (e.g., delete the chunk identifier from the entry).

The storage system repeats the above process until all of the entries of the chunk file metadata data structure having metadata that indicates one or more data chunks were added to a chunk file during data ingestion have been analyzed.

At 510, in-line deduplication is performed. During data ingestion, the storage system performs in-line deduplication by deduplicating data chunks included in a backup with respect to data chunks already stored by the storage system and with respect to other data chunks included in the backup.

Figure 6A:
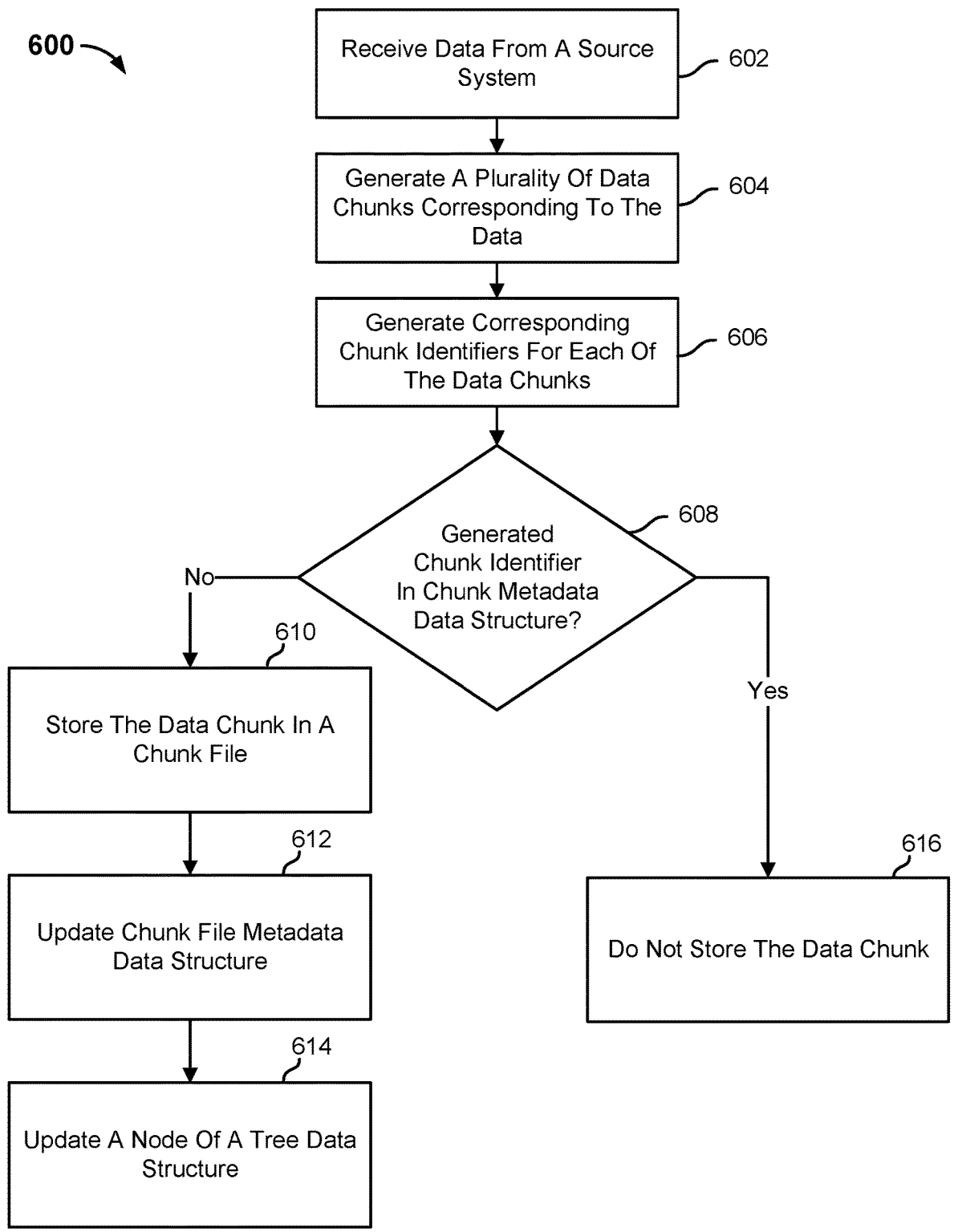
FIG. 6A is a flow diagram illustrating an embodiment of a process for performing partial in-line deduplication.

FIG. 6A is a flow diagram illustrating an embodiment of a process for performing partial in-line deduplication. In some embodiments, process 600 may be implemented by a storage system, such as storage system 112. In some embodiments, process 600 may be implemented to perform some or all of step 506 of process 500.

At 602, data is received from a source system. The received data is stored in a memory of the storage system (e.g., flash memory, random access memory, erasable programmable read only memory, etc.).

At 604, a plurality of data chunks corresponding to the data is generated. In some embodiments, the plurality of data chunks are variable-sized data chunks. In some embodiments, the plurality of data chunks are fixed-sized data chunks.

At 606, corresponding chunk identifiers for each of the data chunks are generated. A cryptographic hash function (e.g., SHA-1, SHA-2, etc.) may be used to generate a chunk identifier for a data chunk.

At 608, it is verified whether a generated chunk identifier is included in a chunk metadata data structure. The chunk metadata data structure includes a plurality of entries that identify the plurality of data chunks that were already stored by the storage system before the backup started. An entry of the chunk metadata data structure associates a chunk identifier associated with a data chunk with a chunk file identifier associated with a chunk file storing the data chunk.

In the event it is determined that a generated chunk identifier is included in the chunk metadata data structure, process 600 proceeds to 616 and the data chunk is not stored in a storage device associated with the storage system. The data chunk is deleted from the memory of the storage system. This prevents duplicate copies of the data chunk from being stored in the storage system.

In the event it is determined that a generated chunk identifier is not included in the chunk metadata data structure, process 600 proceeds to 610.

At 610, the data chunk is stored in a chunk file that is stored in a storage device associated with the storage system.

At 612, the chunk file metadata data structure is updated. The chunk file metadata data structure is updated to include an entry that associates a chunk file identifier with the generated chunk identifier.

At 614, a node of a tree data structure is updated. The tree data structure includes a plurality of nodes that are associated with corresponding data bricks. A data brick is associated with one or more data chunks. For each of the one or more data chunks associated with a data brick, the data brick stores information that associates an object offset for the data chunk with an extent for the data chunk and a chunk file identifier storing the data chunk. The node of the tree data structure is updated to include the chunk file identifier corresponding to the chunk file.

Figure 6B:
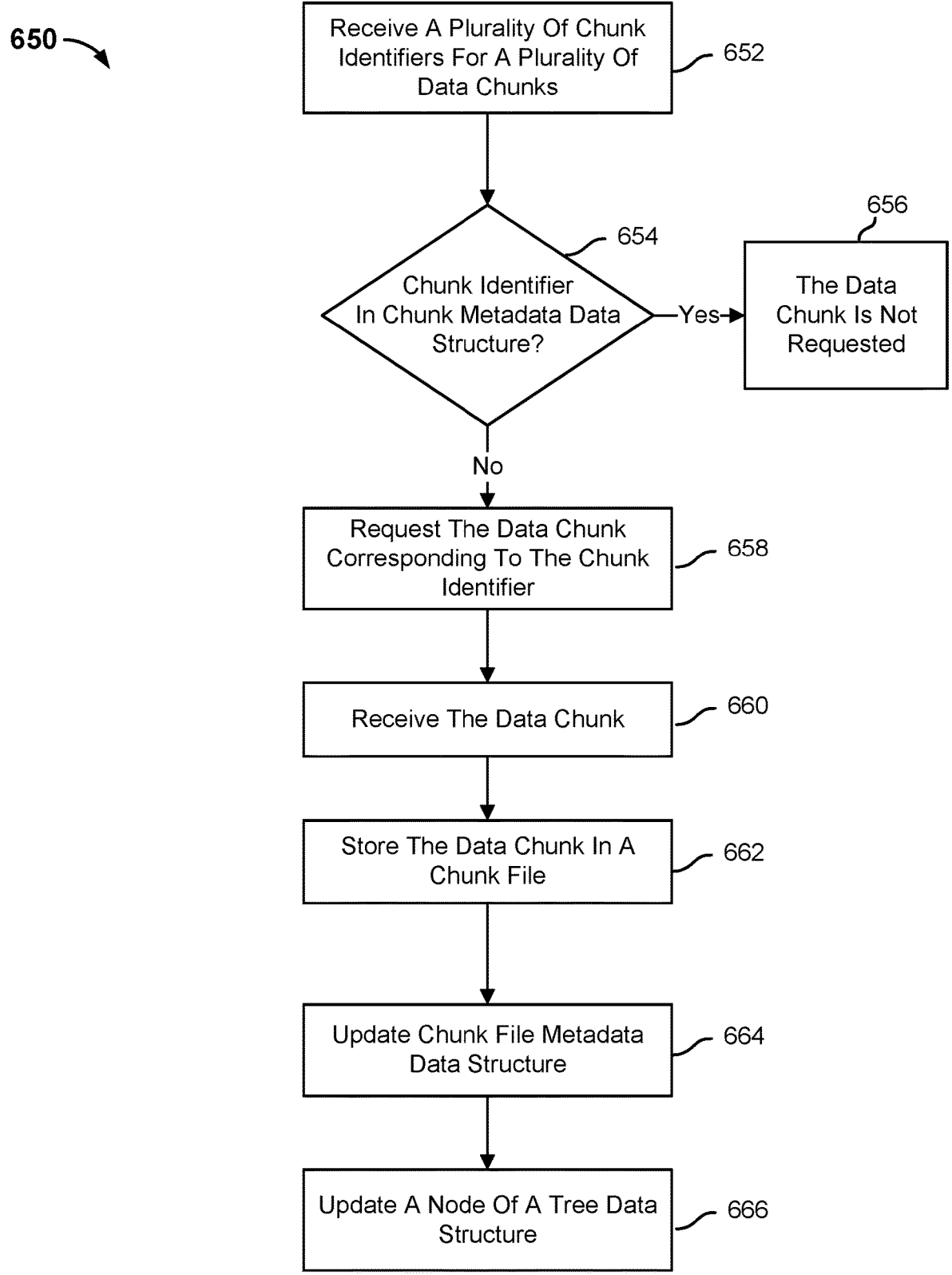
FIG. 6B is a flow diagram illustrating an embodiment of a process for performing partial in-line deduplication.

FIG. 6B is a flow diagram illustrating an embodiment of a process for performing partial in-line deduplication. In some embodiments, process 650 may be implemented by a storage system, such as storage system 112. In some embodiments, process 650 may be implemented to perform some or all of step 506 of process 500.

At 652, a plurality of chunk identifiers for a plurality of data chunks is received. A source system chunks the data to be stored at the storage system into a plurality of data chunks, determines a corresponding chunk identifier (e.g., SHA-1 hash value) for each of the plurality of data chunks, and sends the chunk identifiers to the storage system.

At 654, the storage system determines, for each of the chunk identifiers, whether a chunk identifier is stored in a chunk metadata data structure. In the event the chunk identifier is stored in the chunk metadata data structure, process 650 proceeds to 656 where the data chunk corresponding to the chunk identifier is not requested from the source system. In the event the chunk identifier is not stored in the chunk metadata data structure, process 650 proceeds to 658 where the storage system requests the data chunk corresponding to the chunk identifier from the source system. At 660, the data chunk is received. At 662, the data chunk is stored in a chunk file.

At 664, the chunk file metadata data structure is updated. The chunk file metadata data structure is updated to include an entry that associates a chunk file identifier with the generated chunk identifier.

At 666, a node of a tree data structure is updated. The tree data structure includes a plurality of nodes that are associated with corresponding data bricks. A data brick is associated with one or more data chunks. For each of the one or more data chunks associated with a data brick, the data brick stores information that associates an object offset for the data chunk with an extent for the data chunk and a chunk file identifier storing the data chunk. The node of the tree data structure is updated to include the chunk file identifier corresponding to the chunk file.

Figure 7:
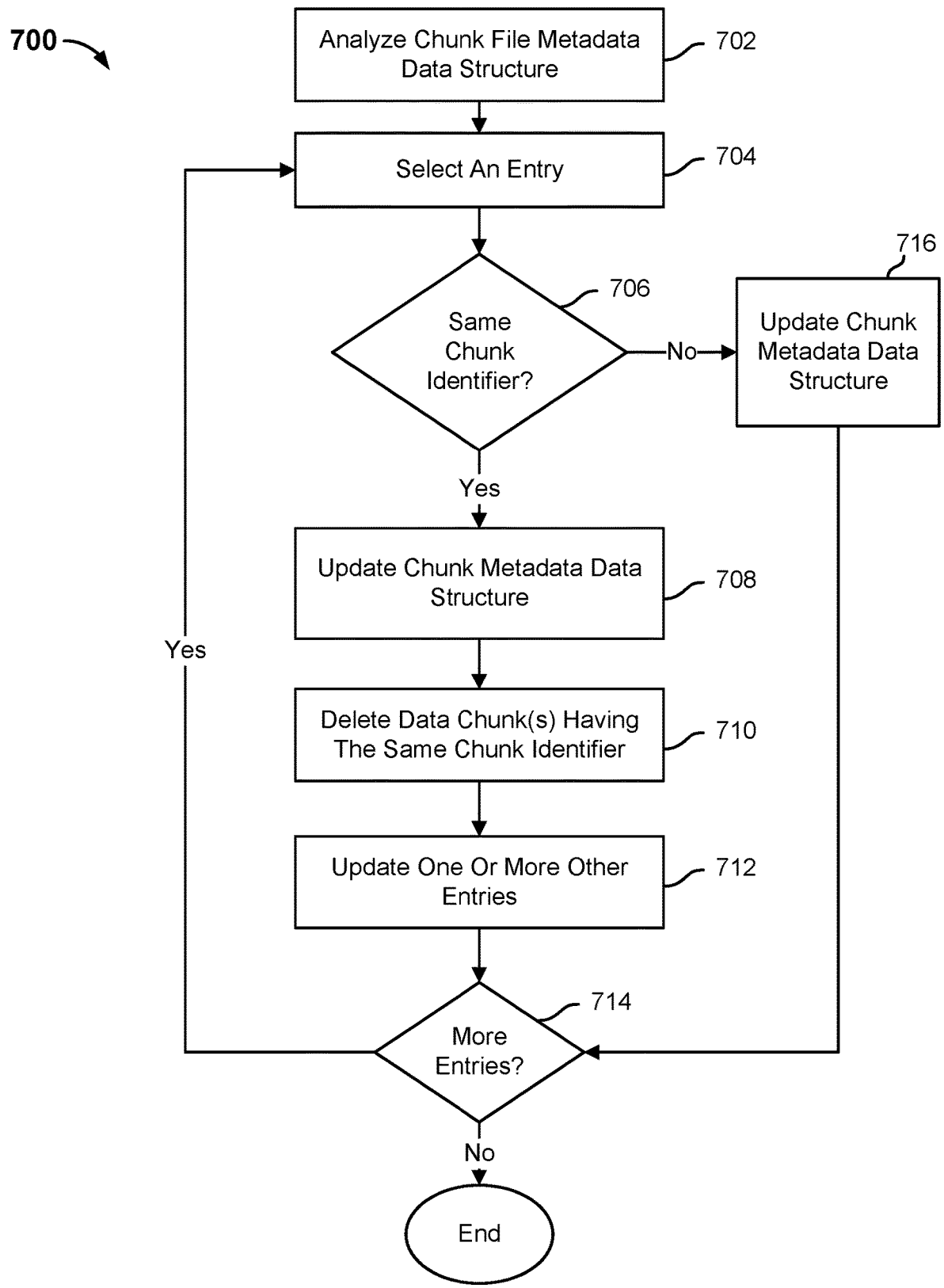
FIG. 7 is a flow diagram illustrating an embodiment of a process for performing partial post-processing deduplication.

FIG. 7 is a flow diagram illustrating an embodiment of a process for performing partial post-processing deduplication. In some embodiments, process 700 may be implemented by a storage system, such as storage system 112. In some embodiments, process 700 may be implemented to perform some or all of step 508 of process 500.

At 702, a chunk file metadata data structure is analyzed to determine one or more entries that include metadata that indicates one or more data chunks were added to a chunk file during data ingestion. The chunk file metadata data structure includes a plurality of entries. Each entry associates a chunk file identifier with one or more chunk identifiers and metadata associated with a chunk file corresponding to the chunk file identifier. The entry indicates the data chunks that are stored in a chunk file having the chunk file identifier. The metadata may indicate that one or more data chunks were added to the chunk file having the chunk file identifier during data ingestion. For example, the metadata may include a bit that indicates one or more data chunks were added to the chunk file and that the chunk file needs to be post processed.

At 704, an entry of the determined one or more entries is selected.

At 706, it is determined whether a chunk identifier associated with the selected entry is the same chunk identifier that is associated with one or more other entries (e.g., entries determined at 702 or all entries of the chunk file metadata data structure). In the event a chunk identifier associated with a selected entry matches a chunk identifier associated with the one or more other entries, process 700 proceeds to 708. In the event a chunk identifier associated with a selected entry does not match a chunk identifier associated with the one or more other entries, process 700 proceeds to 716.

At 708, the chunk metadata data structure is updated to include an entry that associates the chunk identifier associated with the selected entry with the chunk file identifier associated with the selected entry.

At 710, the data chunk having the chunk identifier is deleted from one or more chunk files corresponding to the one or more other entries.

At 712, the one or more other entries are updated to not reference the deleted data chunk (e.g., the chunk identifier is removed from an entry).

At 714, it is determined whether there are more entries of the chunk file metadata data structure to analyze. In the event there are more entries of the chunk file metadata data structure to analyze, process 700 returns to 704 and a next entry of the chunk file metadata data structure is selected. In the event there are no more entries of the chunk file metadata data structure to analyze, process 700 ends.

At 716, the chunk metadata data structure is updated to include an entry that associates the chunk identifier associated with the selected entry with the chunk file identifier associated with the selected entry.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    ingesting at a storage system data received from a source system, wherein ingesting the data includes performing partial in-line deduplication at least in part by:
        generating a plurality of data chunks corresponding to the ingested data, wherein the plurality of data chunks includes a first data chunk, a second data chunk, and a third data chunk;
        determining corresponding chunk identifiers for the plurality of data chunks corresponding to the ingested data; and
        verifying, for each of the plurality of data chunks, whether the corresponding chunk identifier is included in a first data structure tracking identifiers of data chunks that were already stored in a storage of the storage system before the ingesting of the data from the source system, including by:
            determining that a first chunk identifier associated with the first data chunk is included in the first data structure;
            in response to determining that the first chunk identifier associated with the first data chunk is included in the first data structure, deduplicating the first data chunk against a first copy of the first data chunk that was already stored in the storage of the storage system before the ingesting of the data from the source system;
            determining that a second chunk identifier associated with the second data chunk is not included in the first data structure;
            in response to determining that the second chunk identifier associated with the second data chunk is not included in the first data structure, storing a copy of the second data chunk in the storage of the storage system;
            determining that a third chunk identifier associated with the third data chunk is not included in the first data structure, wherein the third chunk identifier associated with the third data chunk matches the second chunk identifier associated with the second data chunk; and
            in response to determining that the third chunk identifier associated with the third data chunk is not included in the first data structure, storing a copy of the third data chunk in the storage of the storage system, wherein the copy of the second data chunk and the copy of the third data chunk are stored in different chunk files; and
    after the ingesting of the data from the source system is completed, performing partial post-processing deduplication of the ingested data stored in the storage having a same chunk identifier and updating the first data structure based on the partial post-processing deduplication, wherein performing the partial post-processing deduplication of the ingested data stored in the storage includes performing deduplication on the copy of the second data chunk and the copy of the third data chunk, wherein the second data chunk and the third data chunk store a same data.

2. The method of claim 1, wherein the plurality of data chunks are variable-sized data chunks.

3. The method of claim 1, wherein performing partial in-line deduplication further includes receiving the data from the source system.

4. The method of claim 1, wherein the first data structure includes a plurality of entries that associate a plurality of chunk identifiers with corresponding chunk file identifiers.

5. The method of claim 1, wherein performing partial in-line deduplication further includes deleting the first copy of the first data chunk corresponding to the first chunk identifier from a memory of the storage system in response to determining that the first chunk identifier is included in the first data structure.

6. The method of claim 1, wherein performing partial in-line deduplication further includes updating a second data structure to indicate that a first chunk file of the different chunk files needs post-processing.

7. The method of claim 6, wherein performing partial in-line deduplication further includes updating a node of a tree data structure to store a reference to the first chunk file storing the copy of the second data chunk.

8. The method of claim 1, wherein performing the partial post-processing deduplication of the ingested data chunks stored in the storage having the same chunk identifier includes analyzing a second data structure to identify chunk files that are storing duplicative data chunks.

9. The method of claim 8, wherein performing the partial post-processing deduplication of the ingested data chunks stored in the storage having the same chunk identifier further includes selecting an entry of the second data structure.

10. The method of claim 9, wherein performing the partial post-processing deduplication of the ingested data chunks stored in the storage having the same chunk identifier further includes determining whether the second data structure includes one or more other entries having the same chunk identifier as the selected entry.

11. The method of claim 10, wherein performing the partial post-processing deduplication of the ingested data chunks stored in the storage having the same chunk identifier further includes updating the first data structure to include an entry that associates the same chunk identifier of the selected entry with a chunk file associated with the selected entry.

12. The method of claim 11, wherein performing the partial post-processing deduplication of the ingested data chunks stored in the storage having the same chunk identifier further includes deleting a data chunk corresponding to the same chunk identifier from one or more chunk files corresponding to the one or more other entries.

13. The method of claim 12, wherein performing the partial post-processing deduplication of the ingested data chunks stored in the storage having the same chunk identifier further includes updating the one or more other entries of the second data structure to not reference the deleted data chunk.

14. A computer program product embodied in a non-transitory computer readable medium and comprising computer instructions for:
ingesting at a storage system data received from a source system, wherein ingesting the data includes performing partial in-line deduplication at least in part by:
generating a plurality of data chunks corresponding to the ingested data, wherein the plurality of data chunks includes a first data chunk, a second data chunk, and a third data chunk,
determining corresponding chunk identifiers for the plurality of data chunks corresponding to the ingested data; and
verifying, for each of the plurality of data chunks, whether the corresponding chunk identifier is included in a first data structure tracking identifiers of data chunks that were already stored in a storage of the storage system before the ingesting of the data from the source system, including by:
determining that a first chunk identifier associated with the first data chunk is included in the first data structure;
in response to determining that the first chunk identifier associated with the first data chunk is included in the first data structure, deduplicating the first data chunk against a first copy of the first data chunk that was already stored in the storage of the storage system before the ingesting of the data from the source system;
determining that a second chunk identifier associated with the second data chunk is not included in the first data structure;
in response to determining that the second chunk identifier associated with the second data chunk is not included in the first data structure, storing a copy of the second data chunk in the storage of the storage system;
determining that a third chunk identifier associated with the third data chunk is not included in the first data structure, wherein the third chunk identifier associated with the third data chunk matches the second chunk identifier associated with the second data chunk; and
in response to determining that the third chunk identifier associated with the third data chunk is not included in the first data structure, storing a copy of the third data chunk in the storage of the storage system, wherein the copy of the second data chunk and the copy of the third data chunk are stored in different chunk files; and
after the ingesting of the data from the source system is completed, performing partial post-processing deduplication of the ingested data chunks stored in the storage having a same chunk identifier and updating the first data structure based on the partial post-processing deduplication, wherein performing the partial post-processing deduplication of the ingested data chunks stored in the storage includes performing deduplication on the copy of the second data chunk and the copy of the third data chunk, wherein the second data chunk and the third data chunk store a same data.

15. The computer program product of claim 14, wherein the plurality of data chunks are variable-sized data chunks.

16. The computer program product of claim 14, further comprising computer instructions for performing partial in-line deduplication at least in part by receiving the data from the source system.

17. The computer program product of claim 14, wherein performing the partial post-processing deduplication of the ingested data chunks stored in the storage having the same chunk identifier includes analyzing a second data structure to identify chunk files that are storing duplicative data chunks.

18. A system, comprising:
a memory; and
one or more processors coupled to the memory, wherein the one or more processors:
ingest at a storage system data received from a source system, wherein to ingest the data, the one or more processors perform partial in-line deduplication at least in part by:
generate a plurality of data chunks corresponding to the ingested data, wherein the plurality of data chunks includes a first data chunk, a second data chunk, and a third data chunk;
determine corresponding chunk identifiers for the plurality of data chunks corresponding to the ingested data; and
verify, for each of the plurality of data chunks, whether the corresponding chunk identifier is included in a first data structure tracking identifiers of data chunks that were already stored in a storage of the storage system before an ingestion of the data from the source system, including by:
determining that a first chunk identifier associated with the first data chunk is included in the first data structure;
in response to determining that the first chunk identifier associated with the first data chunk is included in the first data structure, deduplicating the first data chunk against a first copy of the first data chunk that was already stored in the storage of the storage system before the ingesting of the data from the source system;
determining that a second chunk identifier associated with the second data chunk is not included in the first data structure;

in response to determining that the second chunk identifier associated with the second data chunk is not included in the first data structure, storing a copy of the second data chunk in the storage of the storage system;

determining that a third chunk identifier associated with the third data chunk is not included in the first data structure, wherein the third chunk identifier associated with the third data chunk matches the second chunk identifier associated with the second data chunk; and in response to determining that the third chunk identifier associated with the third data chunk is not included in the first data structure, storing a copy of the third data chunk in the storage of the storage system, wherein the copy of the second data chunk and the copy of the third data chunk are stored in different chunk files; and after the ingesting is completed, perform partial post-processing deduplication of the ingested data chunks stored in the storage having a same chunk identifier and updates the first data structure based on the partial post-processing deduplication, wherein performing the partial post-processing deduplication of the copy of the second data chunk and the copy of the third data chunk, wherein the second data chunk and the third data chunk store a same data.

* * * * *